United States Patent
Suzuki et al.

(10) Patent No.: US 9,672,076 B2
(45) Date of Patent: Jun. 6, 2017

(54) SCHEDULING PROCESS ON A PROCESSOR OR AN ACCELERATOR ON A SYSTEM DRIVEN BY BATTERY BASED ON PROCESSING EFFICIENCY AND POWER CONSUMPTION

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP); Fumihiko Hayakawa, Kawasaki (JP); Naoki Odate, Akiruno (JP); Tetsuo Hiraki, Kawasaki (JP); Toshiya Otomo, Kawasaki (JP)

(73) Assignee: FUJITSU LIMITED, Kawasaki-Shi (JP)

(*) Notice: Subject to any disclaimer, the term of this patent is extended or adjusted under 35 U.S.C. 154(b) by 549 days.

(21) Appl. No.: 14/027,712

(22) Filed: Sep. 16, 2013

(65) Prior Publication Data
US 2014/0282588 A1    Sep. 18, 2014

Related U.S. Application Data

(63) Continuation of application No. PCT/JP2011/056468, filed on Mar. 17, 2013.

(51) Int. Cl.
*G06F 9/46* (2006.01)
*G06F 9/50* (2006.01)
*G06F 1/32* (2006.01)

(52) U.S. Cl.
CPC .......... *G06F 9/5094* (2013.01); *G06F 1/3293* (2013.01); *G06F 9/505* (2013.01);
(Continued)

(58) Field of Classification Search
CPC .... G06F 9/5094; G06F 1/3293; G06F 9/5044; G06F 9/505; G06F 2209/508; Y02B 60/121; Y02B 60/142
See application file for complete search history.

(56) References Cited

U.S. PATENT DOCUMENTS

2002/0064286 A1* 5/2002 Takada ............... H04B 3/23
                                                          381/66
2003/0140222 A1   7/2003 Ohmi et al.
(Continued)

FOREIGN PATENT DOCUMENTS

JP    2006-302168    11/2006
JP    2010-72731      4/2010
(Continued)

OTHER PUBLICATIONS

Japanese International Preliminary Report on Patentability issued Sep. 26, 2013 in corresponding International Application No. PCT/JP2011/056468.

(Continued)

*Primary Examiner* — James J Lee
(74) *Attorney, Agent, or Firm* — Staas & Halsey LLP

(57) ABSTRACT

A system includes a CPU; an accelerator; a comparing unit that compares a first value that is based on a first processing time period elapsing until the CPU completes a first process and a second processing time period elapsing until the accelerator completes the first process, and a second value that is based on a state of use of a battery driving the CPU and the accelerator; and a selecting unit that selects any one among the CPU and the accelerator, based on a result of comparison by the comparing unit.

11 Claims, 22 Drawing Sheets

(52) U.S. Cl.
CPC ...... *G06F 9/5044* (2013.01); *G06F 2209/508* (2013.01); *Y02B 60/121* (2013.01); *Y02B 60/142* (2013.01)

(56) References Cited

U.S. PATENT DOCUMENTS

| | | | | |
|---|---|---|---|---|
| 2009/0109230 | A1* | 4/2009 | Miller | G06F 1/3203 345/506 |
| 2010/0332799 | A1 | 12/2010 | Sonobe | |
| 2011/0131430 | A1* | 6/2011 | Krishnamurthy | G06F 1/3203 713/320 |
| 2011/0131580 | A1* | 6/2011 | Krishnamurthy | G06F 9/5038 718/102 |
| 2011/0161972 | A1* | 6/2011 | Dillenberger | G06F 9/5044 718/104 |
| 2011/0283131 | A1* | 11/2011 | Yamamoto | G06F 1/28 713/340 |
| 2011/0307890 | A1* | 12/2011 | Achilles | G06F 9/505 718/100 |
| 2012/0054770 | A1* | 3/2012 | Krishnamurthy | G06F 9/4893 718/105 |
| 2012/0079298 | A1* | 3/2012 | Majumdar | G06F 11/3409 713/320 |
| 2012/0163279 | A1* | 6/2012 | Tran | H04Q 9/00 370/312 |
| 2013/0152099 | A1* | 6/2013 | Bass | G06F 9/5027 718/103 |
| 2013/0185420 | A1* | 7/2013 | Shimogawa | G06F 9/45558 709/224 |
| 2013/0232495 | A1* | 9/2013 | Rossbach | G06F 9/5038 718/102 |

FOREIGN PATENT DOCUMENTS

| | | |
|---|---|---|
| JP | 2011-13796 | 1/2011 |
| WO | WO 01/95099 | 12/2001 |

OTHER PUBLICATIONS

International Search Report mailed Apr. 12, 2011 in corresponding International Application No. PCT/JP2011/056468.

T. Hamano et al., "Power-Saving Task Scheduling on Heterogeneous Environment," *IEICE* (*The Institute of Electronics, Information and Communication Engineers*) *Technical Report*, vol. 108, No. 180, Aug. 2008, pp. 97-102.

* cited by examiner

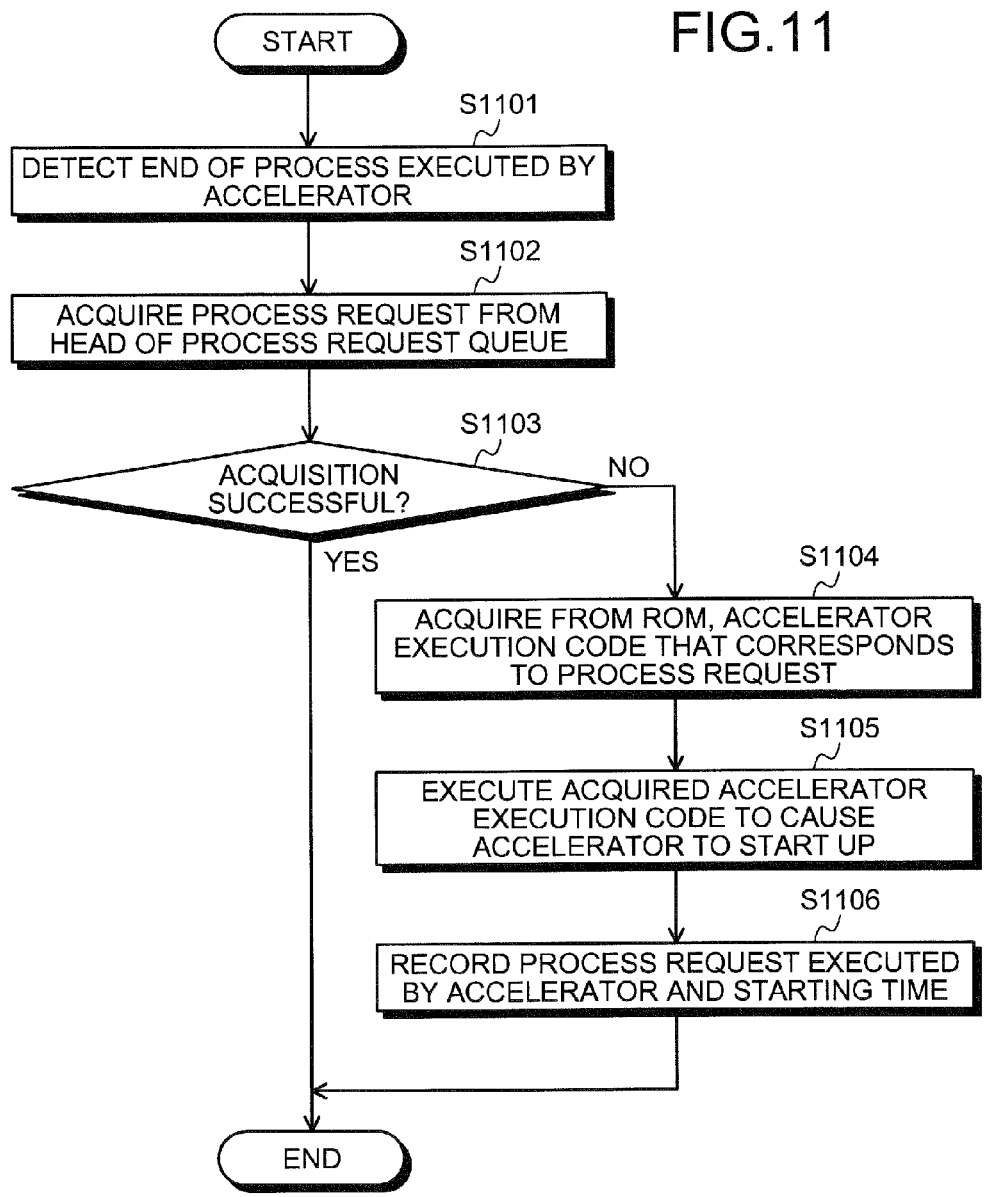

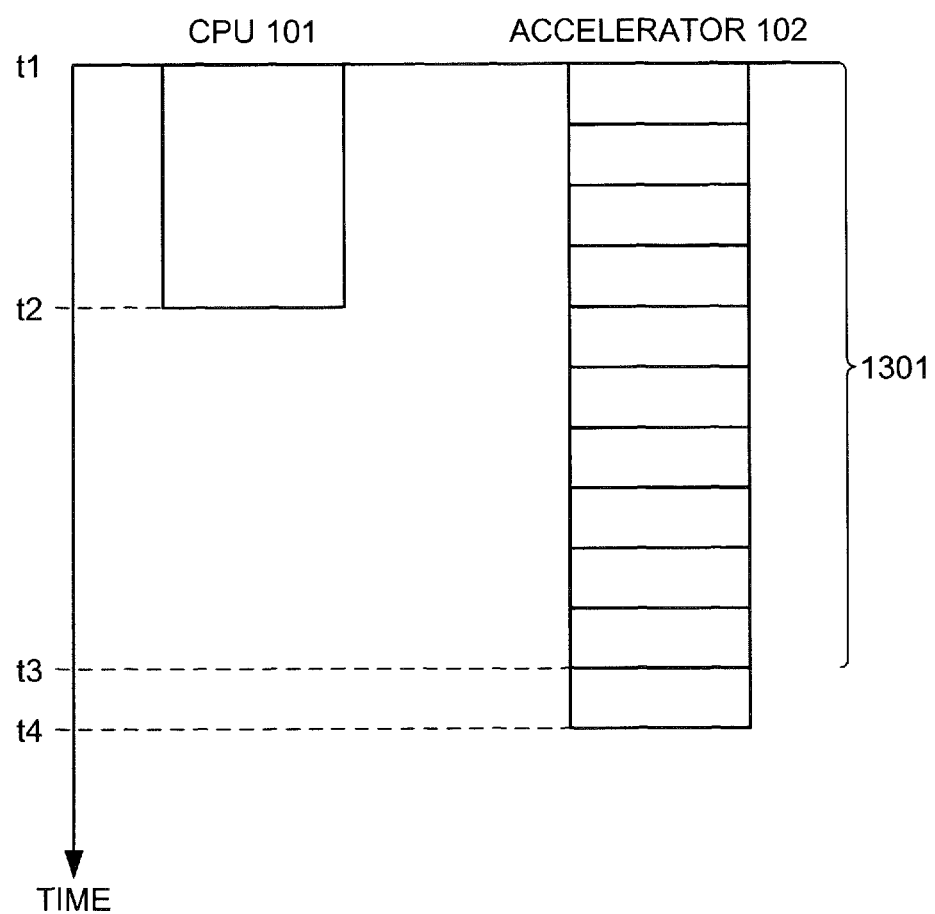

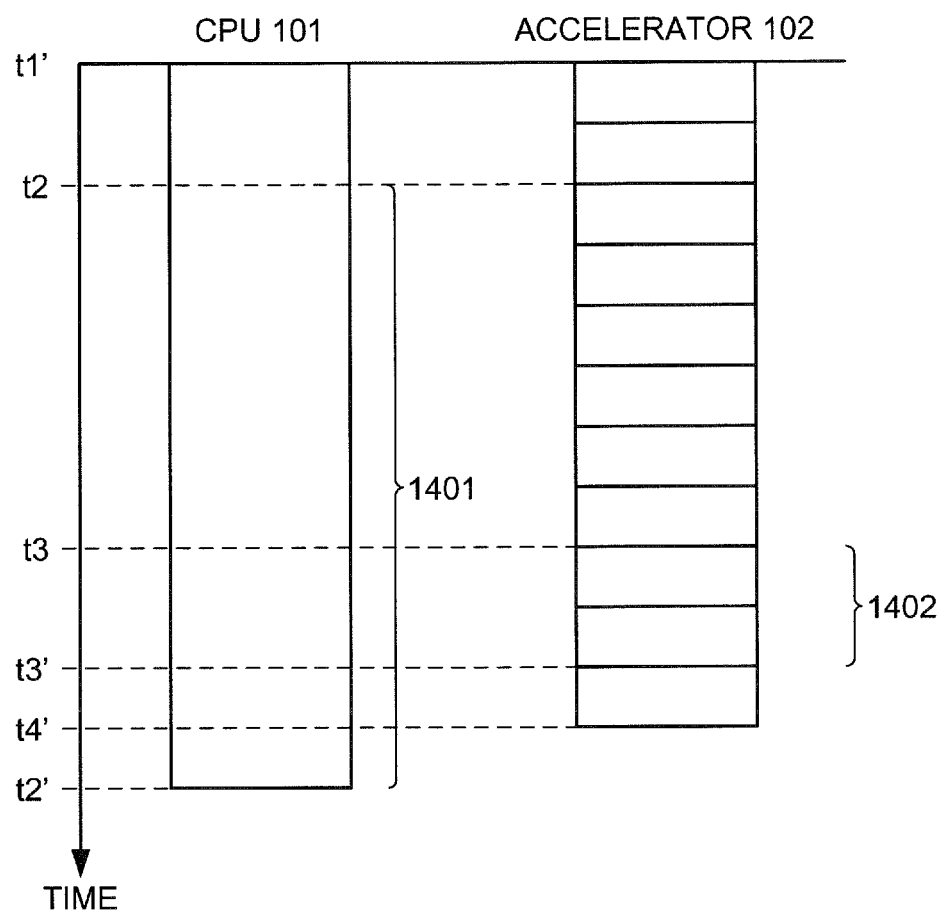

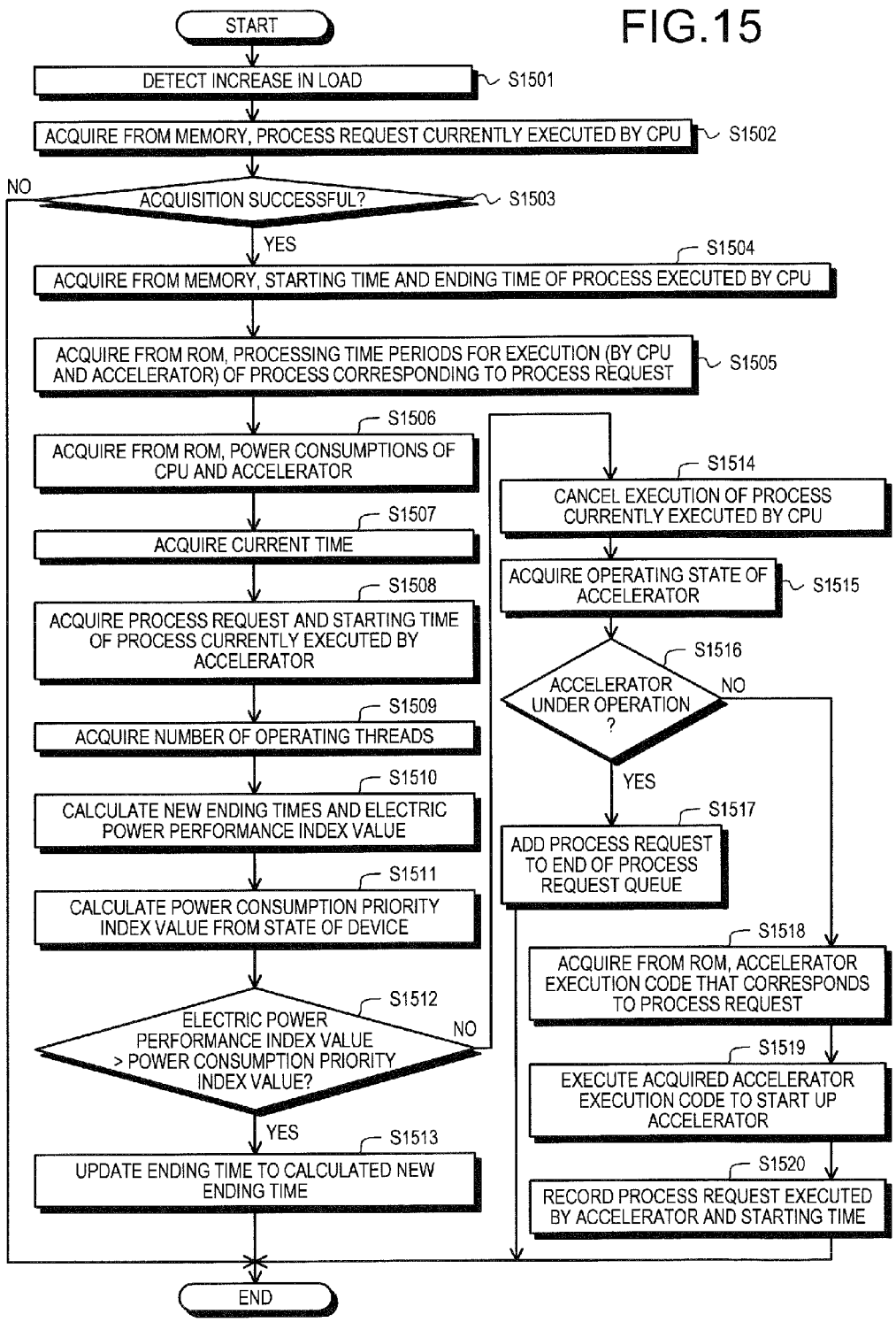

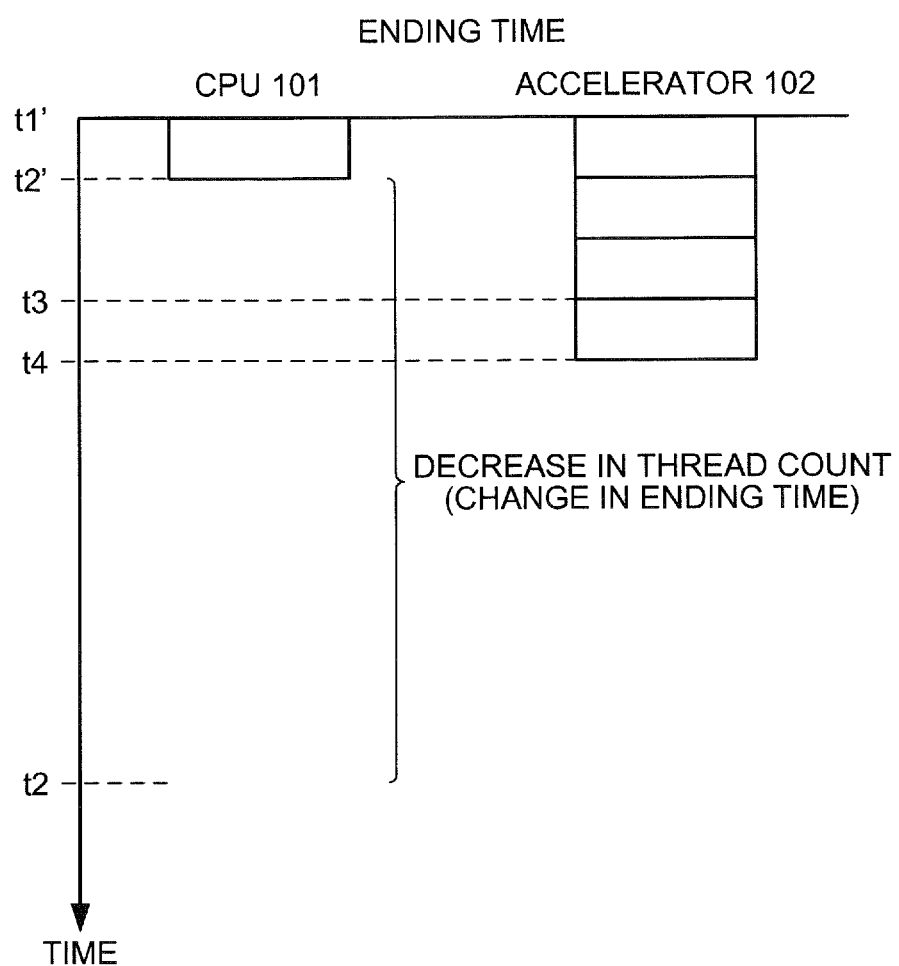

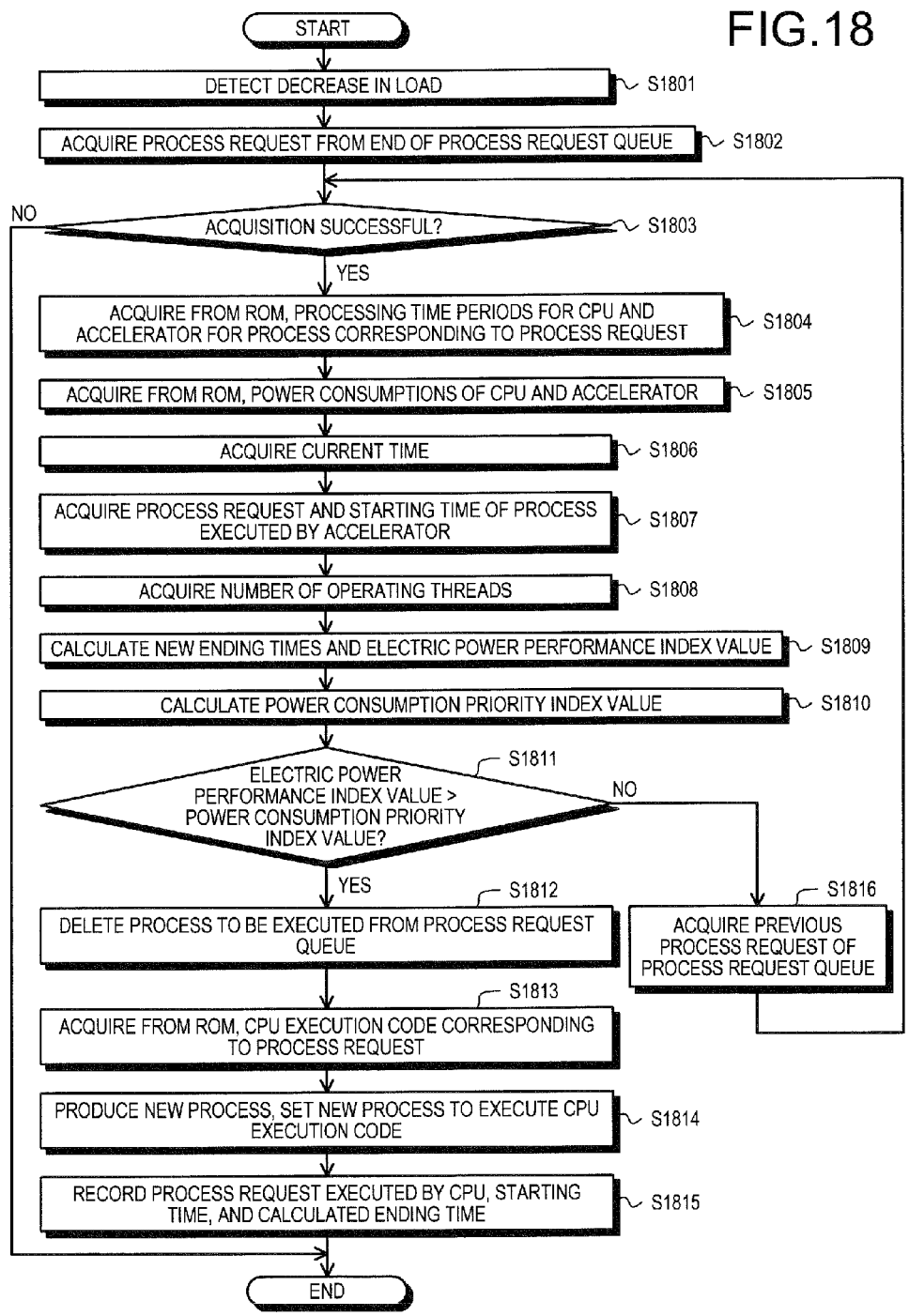

SCHEDULING PROCESS ON A PROCESSOR OR AN ACCELERATOR ON A SYSTEM DRIVEN BY BATTERY BASED ON PROCESSING EFFICIENCY AND POWER CONSUMPTION

CROSS REFERENCE TO RELATED APPLICATIONS

This application is a continuation application of International Application PCT/JP2011/056468, filed on Mar. 17, 2011 and designating the U.S., the entire contents of which are incorporated herein by reference.

FIELD

The embodiments discussed herein are related to a system and a scheduling method that select a processor or an accelerator as an execution assignment destination suitable for a process.

BACKGROUND

A general purpose processor is disposed in a system and the processor executes many processes. For specific processes that each demand high processing performance and whose processing contents are each predetermined, such as a moving image process, a sound process, a 3-D graphic process, and a signal process, a process-dedicated circuit referred to as "hardware engine" or "accelerator" is disposed in the system and the accelerator is caused to execute the specific processes.

In general, a processor has high versatility and, in contrast, is inferior to an accelerator in the power consumption and the processing performance. Therefore, effective use of the accelerator can realize high performance and low power consumption. Judging from only a single process, execution thereof by the accelerator is superior in the power consumption and the performance when the single process is executable by the accelerator.

It is assumed that the accelerator can execute many processes while the processor alone can execute only few processes. In this case, when the accelerator executes all the processes executable by the accelerator, the accelerator suffers heavy congestion and the execution of processes by the accelerator is delayed. As a result, the processing efficiency of the whole system may be degraded. Therefore, an approach is disclosed of executing a portion of a process using the processor even when the process is executable by the accelerator (see, e.g., Japanese Laid-Open Patent Publication Nos. 2006-302168 and 2010-72731).

According to the technique in Japanese Laid-Open Patent Publication No. 2006-302168, when execution of a process is newly requested to the accelerator, the ending time of the execution of the process to be requested is estimated from an estimated processing time period of the process currently waiting for execution by the accelerator, and an estimated processing time period and the starting time for the accelerator of the process to be requested; and when the execution of the process by the accelerator cannot come to an end by an expected time, the process is executed by the processor.

According to the technique in Japanese Laid-Open Patent Publication No. 2010-72731, an index value of the processing time period is set in each of the processes executable by the accelerator; the processes are executed by the processor; and the processes are executed by the accelerator when the index values thereof are not satisfied such as a case where the execution of the processes by the processor does not come to an end within the set processing time period.

From the viewpoint of the processing time period, the efficiency may be excellent when the processor executes some of the processes during the congestion of the accelerator. However, from the viewpoint of the power consumption, the power consumption is lower when the accelerator executes all the processes executable by the accelerator.

Therefore, it is necessary to determine an optimal operating point taking into consideration the trade off between the necessary processing time period (performance) and the power consumption. However, this cannot conventionally be executed.

For example, for a mobile terminal that operates by a battery such as a mobile telephone terminal, the optimal operating point continuously varies according to the situation such as the remaining power amount of the battery, etc. Assuming the use in the mobile terminal, when the remaining power amount of the battery is high, a process may be executed that increases the power consumption while prioritizing performance. However, when the remaining power amount of the battery of the mobile terminal is low, the power consumption is desired to be suppressed as low as possible to maintain operation by the battery until the battery is charged.

According to the technique in Japanese Laid-Open Patent Publication No. 2006-302168, only the performance can be used as the index and, according to the technique in Japanese Laid-Open Patent Publication No. 2010-72731, a fixed index is employed as the precondition. Therefore, these techniques are not applicable to an apparatus whose optimal operating point dynamically varies according to the remaining power amount of the battery like a mobile terminal.

SUMMARY

According to an aspect of an embodiment, a system includes a CPU; an accelerator; a comparing unit that compares a first value that is based on a first processing time period elapsing until the CPU completes a first process and a second processing time period elapsing until the accelerator completes the first process, and a second value that is based on a state of use of a battery driving the CPU and the accelerator; and a selecting unit that selects any one among the CPU and the accelerator, based on a result of comparison by the comparing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart of a process executed by the execution assignment destination determining unit after a process executed by an accelerator comes to an end;

FIG. 13B is a diagram for explaining the ending time of the process executed when the load increases;

FIG. 14B is a diagram for explaining the ending time of the process for the load increase consequent to the elapse of time;

FIG. 15 is a flowchart of an example of a process of determining the execution assignment destination when the load of the process increases;

FIG. 17B is a diagram for explaining the ending time of the process for the load decrease consequent to the elapse of time; and FIG. 18 is a flowchart of an example of a process of determining the execution assignment destination, executed when the load of the process decreases.

DESCRIPTION OF EMBODIMENTS

Preferred embodiments will be explained with reference to the accompanying drawings.

A system disclosed herein is a system including a processor (CPU) that is highly versatile for processing data and whose power consumption is high, and a hardware accelerator whose versatility is low, whose processing speed for specific processes is higher than that of the CPU, and whose power consumption is low. Values are acquired in advance such as an electric power performance index value (a first value) concerning the processing performance of each the CPU and the accelerator, and a power consumption priority index value (a second value) concerning the state of consumption, etc., of the battery that drives the system. Thereby, the CPU or the accelerator is selected as the execution assignment destination to execute the process to be executed next. Thereby, when an apparatus mounted with the system is driven by, for example, a battery, the execution assignment destination corresponding to the variation of the remaining power amount of the battery can properly be selected and the processing efficiency and low power consumption are concurrently established. The description will be made taking an example where the system is mounted on a mobile terminal operated by a battery.

Figure 1:
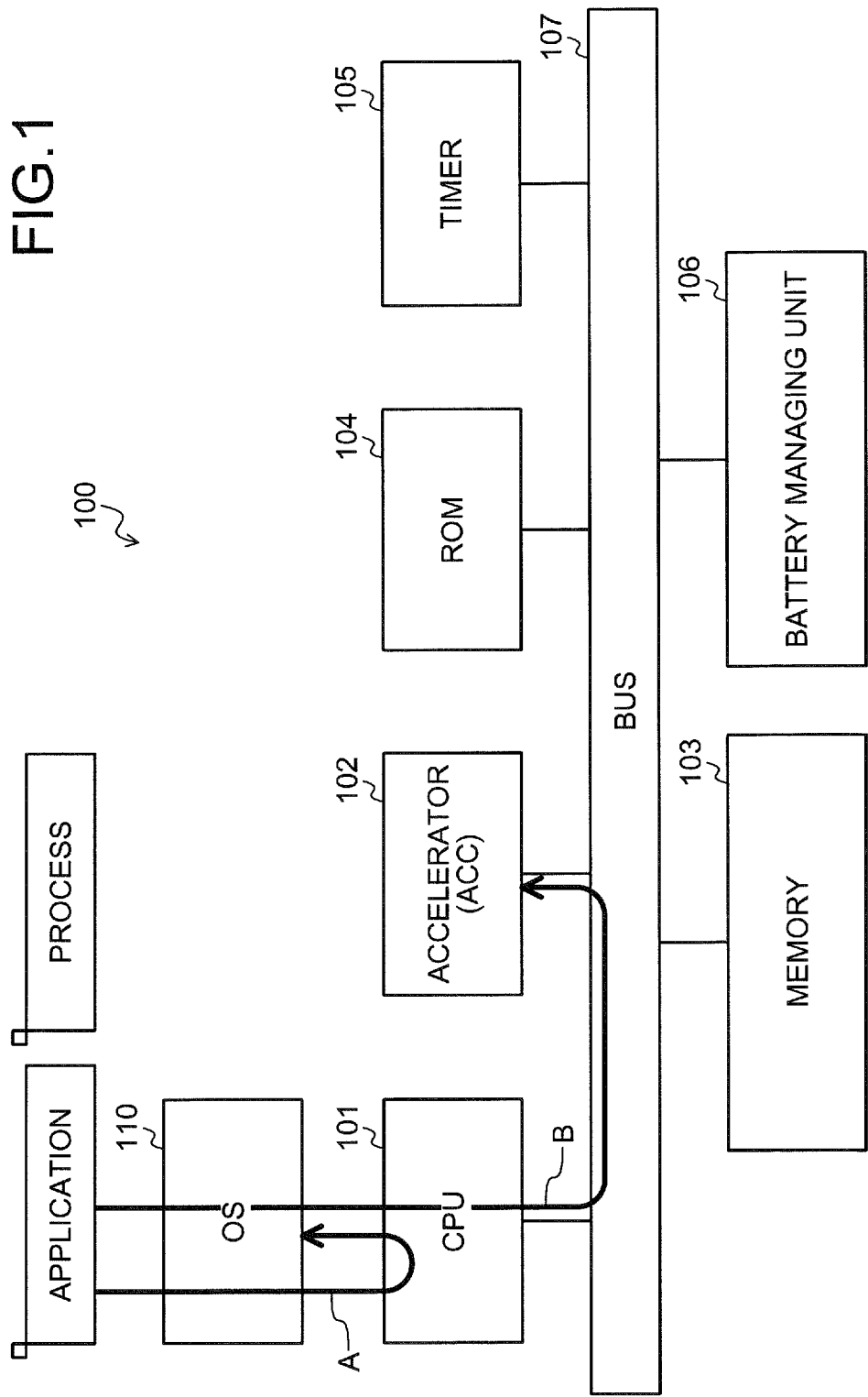
FIG. 1 is a block diagram of an example of a configuration of a system according to an embodiment.

FIG. 1 is a block diagram of an example of a configuration of a system according to the embodiment. The system 100 disclosed herein includes a CPU 101, an accelerator (ACC) 102 that is usable through the CPU 101, memory 103, ROM 104, a timer 105 that counts the current time, a battery managing unit 106, and a bus (BUS) 107 that connects the components from the CPU 101 to the battery managing unit 106 to each other. The ROM 104 stores information concerning the processing time period and the power consumption of each of the CPU 101 and the accelerator 102, etc. The CPU 101 controls the execution of a process of an application by an operating system (OS) 110.

The execution assignment destination of the application is designated by the OS 110 to be the CPU 101 or the accelerator 102. When the CPU 101 is determined to be the execution assignment destination, an execution code for the CPU is output to the CPU 101 through a path denoted by "A" in FIG. 1. When the accelerator 102 is determined to be the execution assignment destination, an execution code for the accelerator is output to the accelerator 102 through the CPU 101 in a path denoted by "B" in FIG. 1.

Figure 2:
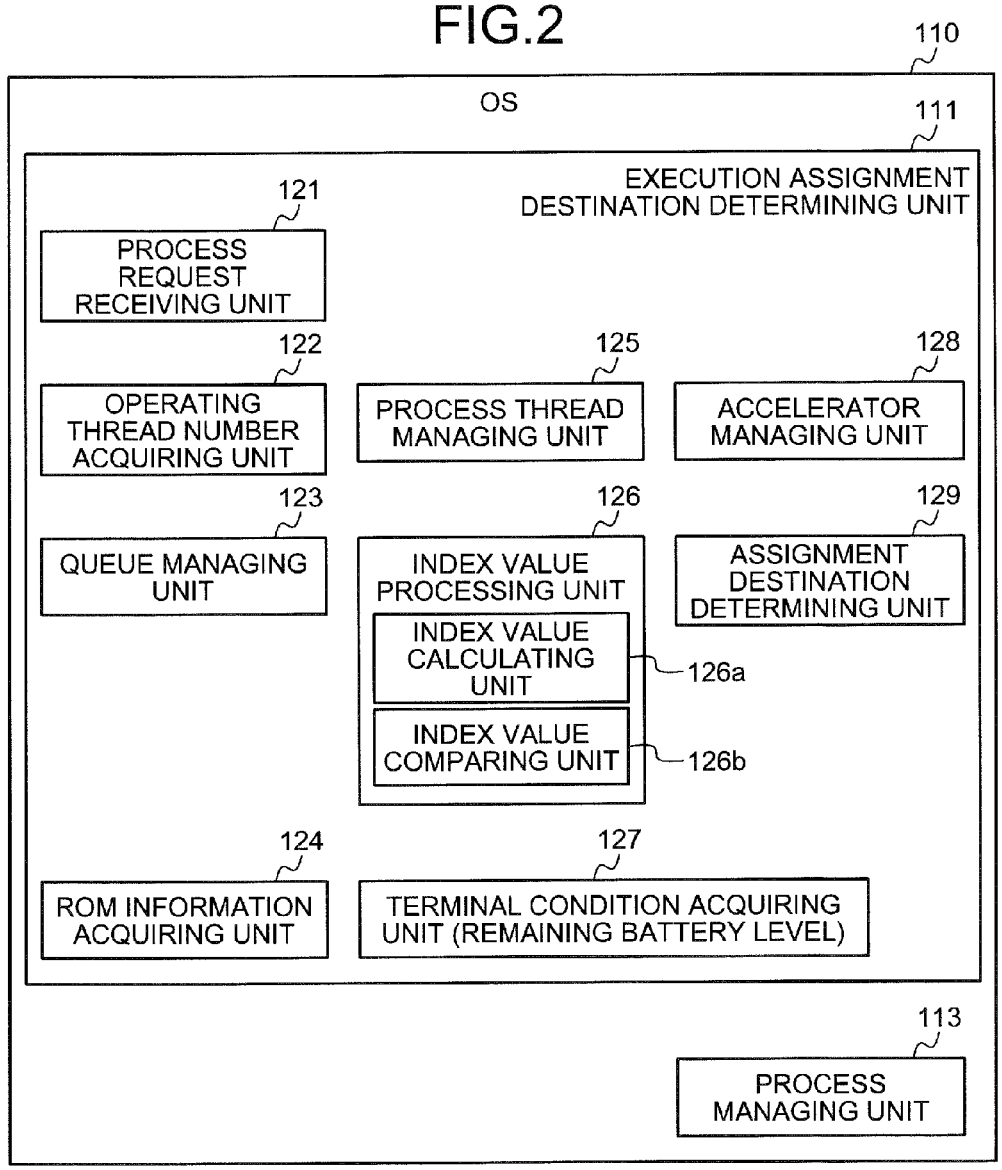
FIG. 2 is a block diagram of an example of an internal configuration of the operating system.

FIG. 2 is a block diagram of an example of an internal configuration of the operating system. The OS 110 includes an execution assignment destination determining unit 111 and a process managing unit 113. The execution assignment destination determining unit 111 determines the execution assignment destination of the process of the application to be any one among the CPU 101 and the accelerator 102. The process managing unit 113 manages the process and the thread of the process during the execution of the application. The number of operating threads is notified of to an operating thread number acquiring unit 122 of the execution assignment destination determining unit 111 and is notified of each time the number of operating threads increases or decreases. The process managing unit 113 functions as a monitoring unit that monitors the load on the CPU 101.

For example, the execution assignment destination determining unit 111 includes a process request receiving unit 121, the operating thread number acquiring unit 122, a queue managing unit 123, a ROM information acquiring unit 124, a process thread managing unit 125, an index value processing unit 126, a terminal condition acquiring unit 127, an accelerator managing unit 128, and an assignment destination determining unit (selecting unit) 129. The index value processing unit 126 includes an index value calculating unit (calculating unit) 126a that calculates the electric power performance index value (the first value) and the power consumption priority index value (the second value), and an index value comparing unit (comparing unit) 126b that compares the electric power performance index value (the first value) with the power consumption priority index value (the second value).

The process request receiving unit 121 receives a notification of process request addition or a load increase/decrease from the thread of the application to be executed, and causes processing by the execution assignment destination determining unit 111 to start. The operating thread number acquiring unit 122 acquires the number of currently operating threads from the process managing unit 113. The queue managing unit 123 adds or deletes a process request to/from the execution queue of the accelerator 102 and acquires queued process request information. The ROM information acquiring unit 124 acquires information concerning the processing time period and the power consumption recorded on the ROM 104. The process thread managing unit 125 starts up, assigns a process to, detects the end of, cancels, acquires the remaining processing time period of, etc., the thread to be processed for a case where the CPU 101 executes the process request.

The index value processing unit 126 calculates the electric power performance index value and the power consumption priority index value that are indexes necessary for determining the execution assignment destination of the application. The terminal condition acquiring unit 127 acquires the remaining power amount of the battery from the battery managing unit 106 and, in addition, acquires the use state of the mobile terminal (such as the opened or closed state of a lid thereof, which is opened or closed according to the use or unused state thereof, and presence or absence of connection to the power source) from a detecting unit not depicted disposed in the mobile terminal. The accelerator managing unit 128 manages the processes executed by the accelerator such as allocation of the process request at the head of the queue to the accelerator and detection of the end of the process executed by the accelerator. The assignment destination determining unit 129 determines which among the CPU 101 and the accelerator 102 is to execute the process request.

An overview will be described of the determination made by the execution assignment destination determining unit 111 as to which among the CPU 101 and the accelerator 102 is to be the execution assignment destination of the application.

Figure 3:
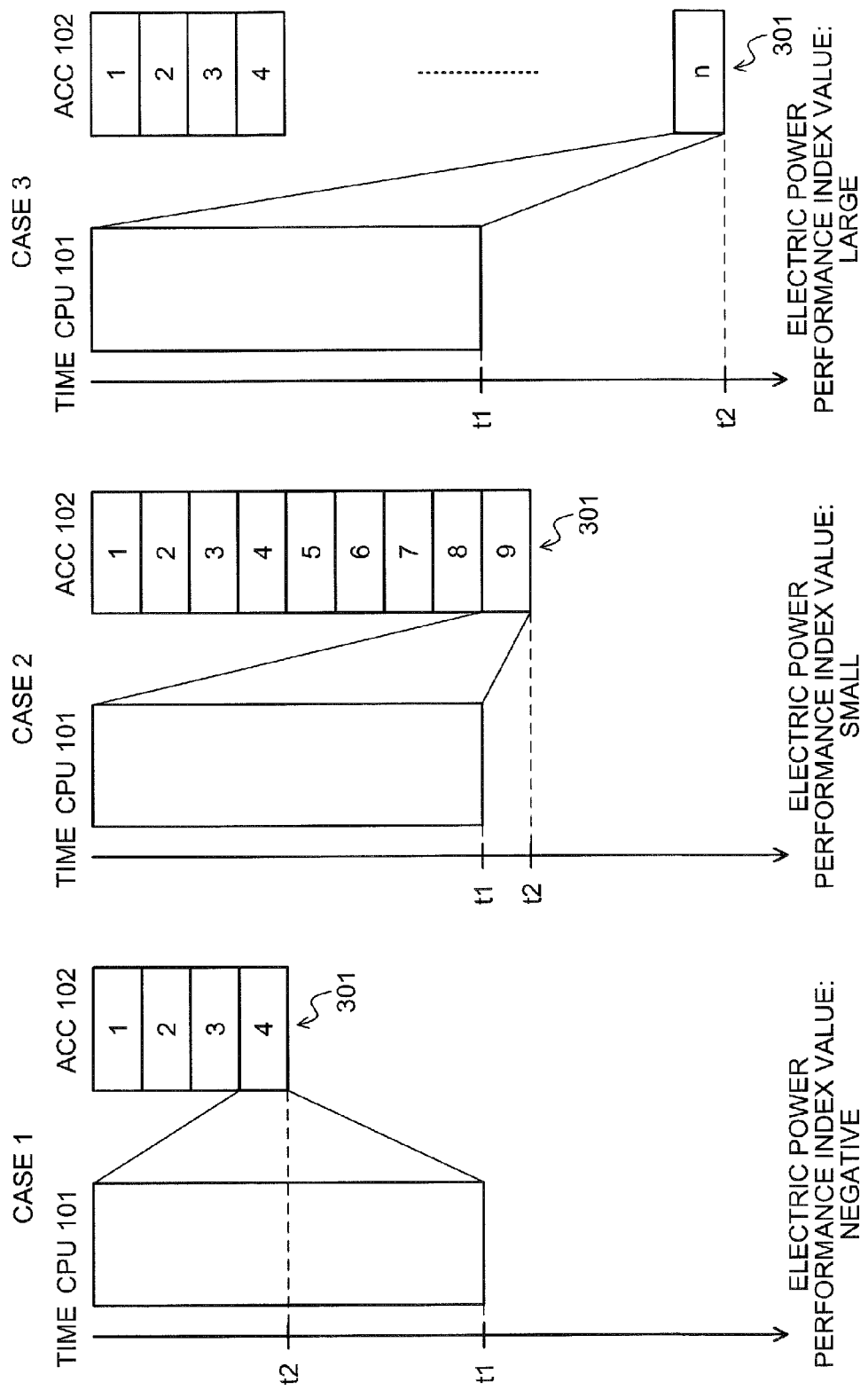
FIG. 3 is a diagram for explaining the ending time of each execution assignment destination.

FIG. 3 is a diagram for explaining the ending time of each execution assignment destination. The execution assignment destination determining unit 111 estimates the ending time of execution of one process (a first process) of the application by the CPU 101 and the ending time of execution of the one process by the accelerator 102, and calculates the processing time period (a first processing time period) consumed when the CPU 101 executes the first process and the processing time period (a second processing time period) consumed when the accelerator 102 executes the first process.

The execution assignment destination determining unit 111 compares differences between the first and the second processing time periods (and the ending times thereof) from the first and the second processing time periods. In this comparison, the difference is acquired between the power consumption necessary for the processing by the CPU 101 necessary for the first processing time period (a first power consumption) and the power consumption necessary for the processing by the accelerator 102 necessary for the second processing time period (a second power consumption), and the electric power performance index value is acquired based on the difference. The execution assignment destination determining unit 111 (the assignment destination determining unit 129) selects the CPU 101 or the accelerator 102 to execute the first process based on the electric power performance index value and the power consumption priority index value concerning the power consumption of the mobile terminal such as the remaining power amount of the battery acquired by the terminal condition acquiring unit 127; and assigns an execution assignment destination for the process. The power consumption priority index value is used as a threshold value to be compared with the electric power performance index value to determine the execution assignment destination.

FIG. 3 depicts the processing time period for each of the CPU 101 and the accelerator (ACC) 102 to execute each thread, for various cases. In a case 1 where the accelerator 102 has four threads 301 and the CPU 101 is caused to execute the fourth thread next, when the CPU 101 executes the fourth thread, an ending time t1 for the CPU 101 is later than an ending time t2 for the execution by the accelerator 102. In this case, the electric power performance index value is set to be negative. In other words, if the accelerator 102 executes all the threads, the processing ends sooner.

In a case 2 where the accelerator 102 has nine threads 301 and the CPU 101 is caused to execute the ninth thread next, the ending time t1 for the CPU 101 acquired when the CPU 101 executes the ninth thread is somewhat earlier than the ending time t2 acquired if the accelerator 102 executes the ninth thread. In this case, the electric power performance index value is set to be small. When the performance is prioritized, the CPU 101 is set to be the execution assignment destination. However, taking the power consumption into consideration, the accelerator 102 more advantageously executes the thread.

In a case 3 where the accelerator 102 has many (n) threads 301 and the CPU 101 is caused to execute the n-th thread next, the ending time t1 for the CPU 101 to execute the n-th thread can be set to be earlier than the ending time t2 for the accelerator 102 to execute the thread. In this case, the electric power performance index value is set to be large. The execution assignment destination is determined based on whether the performance or the power consumption is to be given priority.

In all the cases 1 to 3, it is assumed that the threshold value (the power consumption priority index value described later) is zero; a positive value is large or small, or the value is negative. The system may be configured to vary the threshold value based on the condition of the mobile terminal such as, for example, the current remaining power amount of the battery, etc. This point will be described with the power consumption priority index value described later.

The electric power performance index value will be described. The electric power performance index value is acquired by the index value processing unit 126 by the computation as below.

electric power performance index value=(the ending time $t2$ for the accelerator−the ending time $t1$ for the CPU)/(a power consumption $PH1$ of the CPU−a power consumption $PH2$ of the accelerator)

The power consumption PH1 of the CPU 101 is PH1=the power consumption P1 of the CPU×a processing time period T1 necessary for the processing by the CPU, and the power consumption PH2 of the accelerator 102 is PH2=the power consumption P2 of the accelerator×a processing time period T2 necessary for the processing by the accelerator.

"P1", "P2" and "T1", "T2", or "PH1" and "PH2" are fixed values recorded in advance in the ROM 104 based on measurement executed at the design phase described later.

The ending time t1 for the CPU 101 is estimated based on any one among "1." and "2." below.

1. The ending time t1 for the CPU 101=a starting time t0+the total remaining time period tm of the assigned process+the processing time period T1 for the process to be executed 2. The ending time t1 for the CPU 101=the starting time t0+the processing time period T1 for the process to be executed/(1−the operation rate of the CPU 101)

Selection from among "1." and "2." may be based on whether the processing time period necessary for all the other processes is known.

Figure 4:
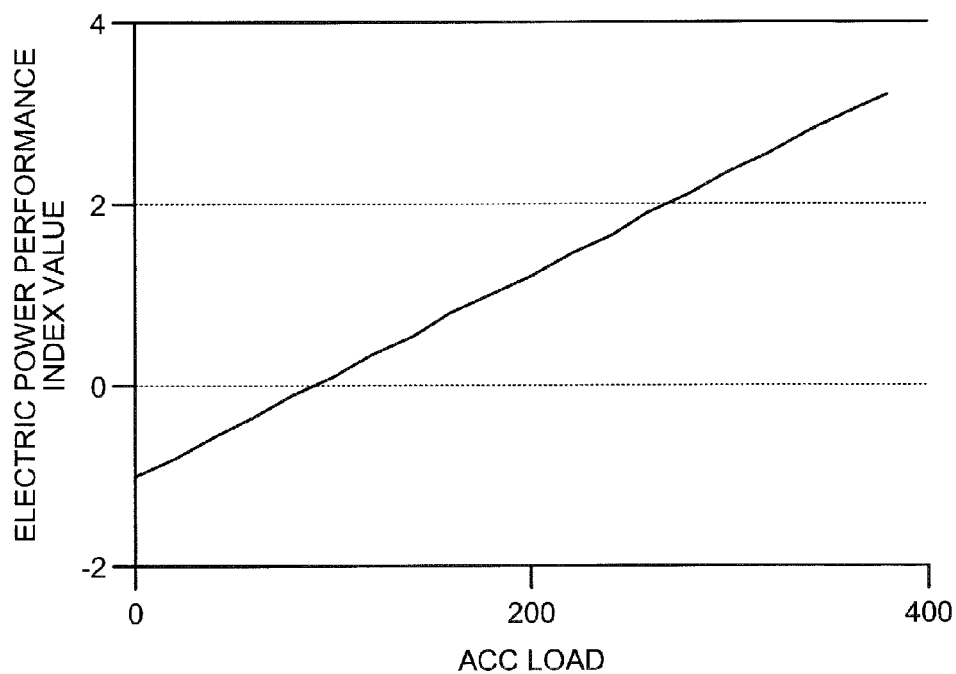
FIG. 4 is a chart of an example of an electric power performance index value with respect to the amount of load.

FIG. 4 is a chart of an example of the electric power performance index value with respect to the amount of load.

The depicted example is an example where the amount of the load on the accelerator 102 and the electric power performance index value are proportional to each other. The electric power performance index value increases as the amount of the load on the accelerator 102 increases.

The ending time t2 for the accelerator 102 is estimated from the equation below.

> ending time *t*2 for the accelerator 102=the starting time *t*0+the remaining time period *tn*1 of the currently executed process and the total processing time period *tn*2 of unexecuted processes+the processing time period *T*2 of the process to be executed The determination of the power consumption priority index value will be described. The index value processing unit 126 calculates the power consumption priority index value from any one of "1." to "3." below. Items such as the remaining power amount of the battery, the power source connection condition, and the open or closed state of the mobile terminal are acquired from the terminal condition acquiring unit 127.

1. The power consumption priority index value is calculated based only on the remaining power amount of the battery.

> power consumption priority index value "*a*"=α/the remaining power amount of the battery (α: an arbitrary coefficient)

The power consumption priority index value is used when the mobile terminal is driven by the battery.

2. The power consumption priority index value is calculated based on presence or absence of the power source connection.

When the power source is connected, the power consumption priority index value b is set to be b=0 (the performance is given the highest priority).

When the mobile terminal is driven by the battery, the power consumption priority index value "a"=α/the remaining power amount of the battery.

In this case, information concerning whether the mobile terminal is connected to the power source is acquired using the terminal condition acquiring unit 127 and either one of the power consumption priority index values "a" and "b" is selected. For example, when the mobile terminal is connected to the power source (during the battery charging), that is, when the mobile terminal is placed on a cradle for the charging, the power consumption priority index value b is selected. When the mobile terminal is driven by the battery, that is, when the mobile terminal is removed from the cradle, the power consumption priority index value a is selected.

3. The power consumption priority index value is calculated based on the open or closed state (operation state) of the mobile terminal. This is applied to the case where the cover of the foldable mobile terminal is freely opened and closed and the terminal is operated and used when the cover is opened.

When the mobile terminal is opened, the power consumption priority index value a=α/the remaining power amount of the battery.

When the mobile terminal is closed, the power consumption priority index value b=β/the remaining power amount of the battery.

(α, β: arbitrary coefficients. It is assumed that α and β are α<β and that, when the mobile terminal is opened, the performance is prioritized.)

In addition to the above "1." to "3.", the values may be fixed values (such as the value zero). The fixed values and the values of the coefficients are determined from the required operation time period, the required performance, etc. of the mobile terminal at the design phase described later, and the values of the electric performance index value and the power consumption priority index value that is the threshold value are matched to be values comparable with each other. As above, the terminal condition acquiring unit 127 acquires the remaining power amount of the battery or the use state of the mobile terminal concerning the remaining power amount of the battery, and the index value processing unit 126 acquires the power consumption priority index value.

Figure 5:
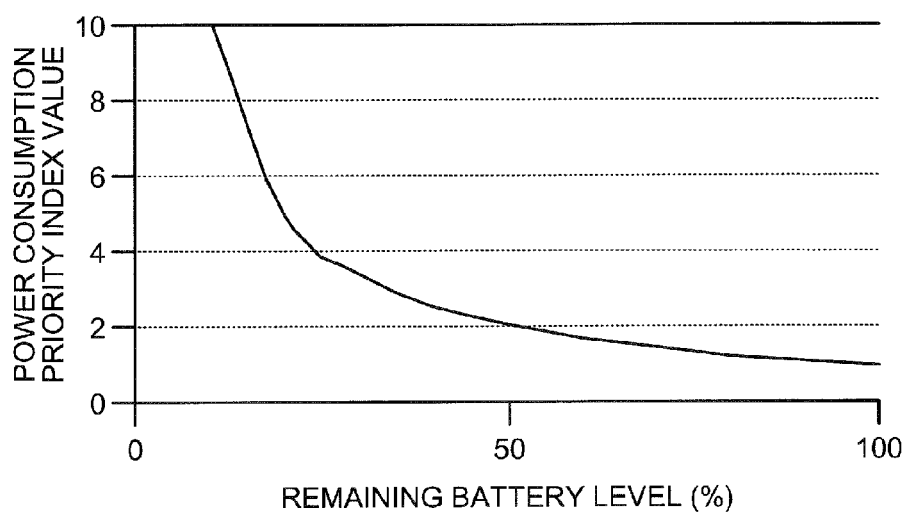
FIG. 5 is a chart of an example of a power consumption priority index value with respect to the remaining power amount of a battery.

FIG. 5 is a chart of an example of the power consumption priority index value with respect to the remaining power amount of the battery. In the depicted example, the rate of the variation of the power consumption priority index value increases as the remaining power amount of the battery decreases.

The ROM 104 stores information that is necessary for design (the design phase) before the mobile terminal is practically used. At the design phase, the execution assignment destination determining unit 111 measures and records in the ROM 104, the processing time period and the power consumption of the cases where the CPU 101 executes the process executable by the accelerator 102 and where the accelerator 102 executes this process.

During the execution of the process when the mobile terminal is practically used (an execution phase), the execution assignment destination determining unit 111 (the index value processing unit 126) calculates the electric power performance index value based on the information recorded in the ROM 104 and the assignment destination determining unit 129 determines which among the CPU 101 and the accelerator 102 is to be the execution assignment destination, based on the electric power performance index value and the power consumption priority index value.

Figure 6:
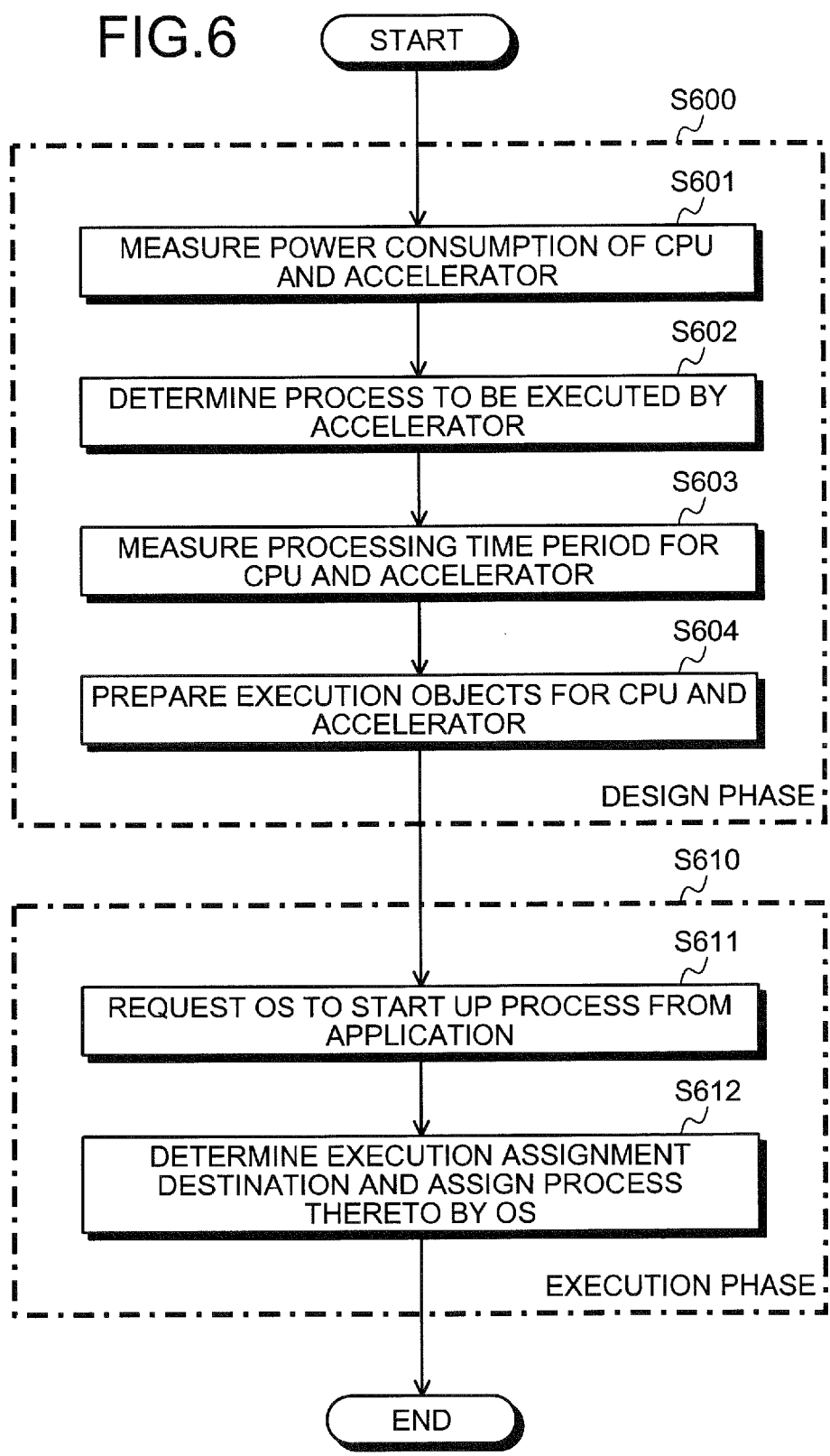
FIG. 6 is a flowchart of an overview of a process concerning an execution assignment destination determination at a mobile terminal.

FIG. 6 is a flowchart of an overview of a process concerning the execution assignment destination determination at the mobile terminal. At the stage of the design phase S600, the power consumption of the CPU 101 and the accelerator 102 is measured respectively (step S601). The process to be executed by the accelerator 102 is determined (step S602). The processing time period for the CPU 101 and the accelerator 102 is measured respectively (step S603). Execution objects for the CPU 101 and the accelerator 102 are prepared (step S604).

For example, in the process at the design phase S600, an application (program) to be executed by the mobile terminal is developed; a process to be executed by the accelerator 102 is determined from among the processes to be executed in the application; when the process to be executed by the accelerator 102 is determined, program code to execute the process using the accelerator 102 is produced from the program of the application; and program code to execute using the CPU 101 a process having the same content as that of the process to be executed by the accelerator 102 is produced therefrom.

The processing time period is actually measured for each of the cases where the program code is actually executed to execute the process using the accelerator 102 and where the program code is actually executed to execute the process using the CPU 101. When the same accelerator 102 is used in different manners, the processing time period is measured for each manner. The power consumption during the processing time period of each among the CPU 101 and the accelerator 102 is measured using a power consumption measuring device, etc. The measured power consumption and the processing time period for each manner of use are stored to the ROM 104. The produced application, the program code to execute the process using the accelerator 102, and the program code to execute, using the CPU 101, the same process as that to be executed by the accelerator 102 are also stored to the ROM 104.

Figure 7:
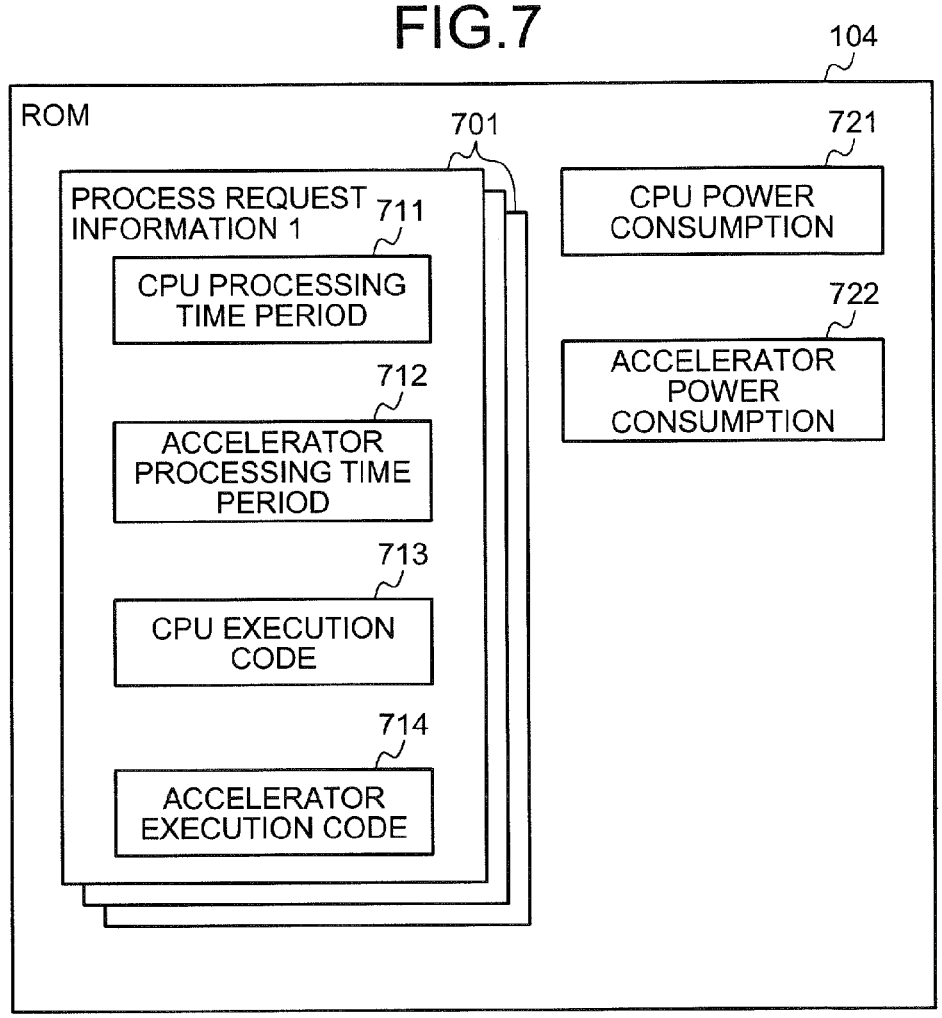
FIG. 7 is a diagram of information stored to ROM at a design phase.

FIG. 7 is a diagram of information stored to the ROM at the design phase. The ROM 104 stores process request information (1 to n) for each process of the application, CPU power consumption 721, and accelerator power consumption 722. For example, the process request for an application process 1 includes a CPU processing time period 711, an accelerator processing time period 712, a CPU execution code 713, and an accelerator execution code 714.

Returning back to the description with reference to FIG. 6, after the information is stored to the ROM 104 at the design phase S600, the procedure progresses to the execution phase S610 to practically operate the mobile terminal. In the process at the execution phase S610, the application requests the OS 110 to start up the process (step S611); whereby, the OS 110 determines the execution assignment destination of the process to be the CPU 101 or the accelerator 102 and assigns the process thereto (step S612); and the series of process steps come to an end.

At the execution phase S610, when the accelerator 102 is to execute a process in the application (program), the OS 110 requests the accelerator 102 to execute the process. When the accelerator 102 is available, the OS 110 executes the program code to use the accelerator 102 stored in the ROM 104 and starts the execution of the process using the accelerator 102. At this step, the type and the start-up time of the process to be started up are stored to the memory 103. When the accelerator 102 is under use, the OS 110 records each process request using a queue-type data structure. When the execution by the accelerator 102 is completed, the OS 110 executes the program code to use the accelerator 102 based on the process request at the head of the queue.

Figure 8:
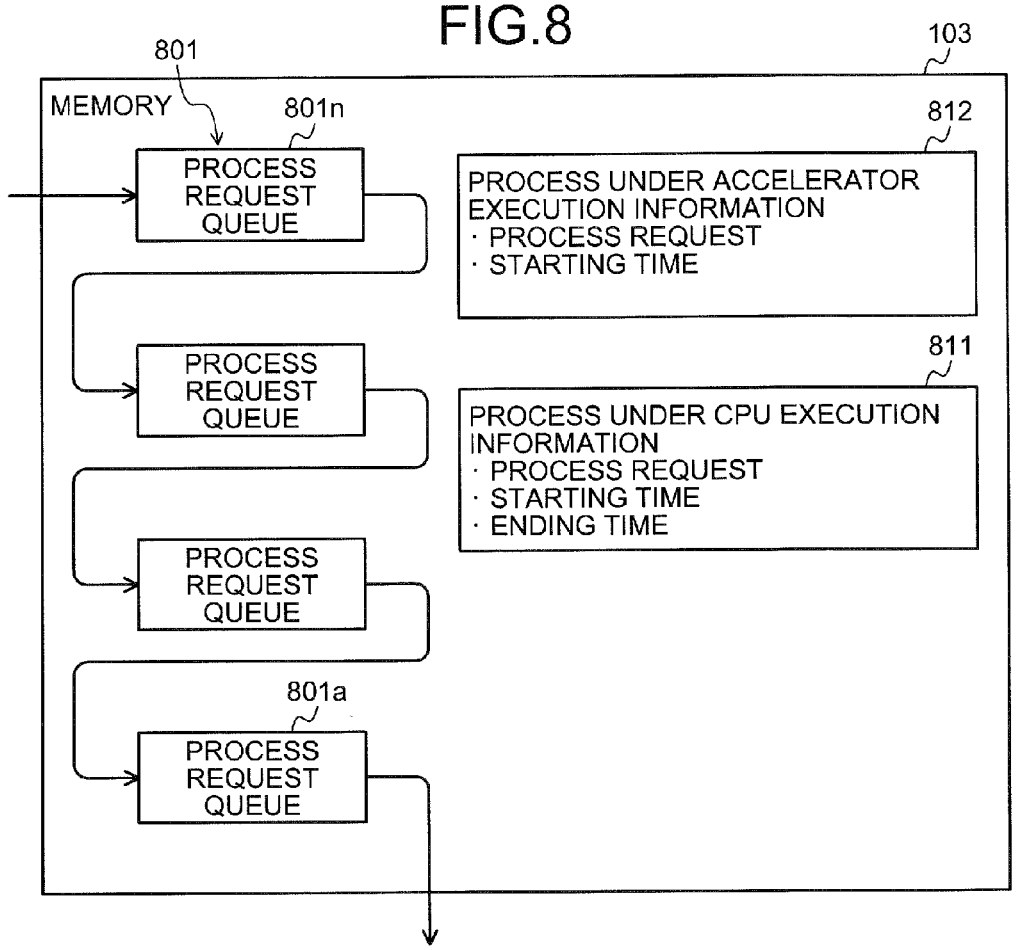
FIG. 8 is a diagram of information stored to memory at an execution phase.

FIG. 8 is a diagram of information stored to the memory at the execution phase. The memory 103 stores process requests that are in process request queues 801 (801a to 801n) and the process requests are sequentially processed from that in the process request queue 801a at the head. The memory also stores process under CPU execution information 811 for the CPU 101 and process under accelerator execution information 812 for the accelerator 102. The process under CPU execution information 811 can be a process request, a starting time, etc. The process under accelerator execution information 812 can be a process request, a starting time, an ending time, etc.

Whether the process request is actually added to the process request queue 801 is determined by the execution assignment destination determining unit 111 in the OS 110. The execution assignment destination determining unit 111 determines whether the requested process is to be added to the process request queue 801 or is to be executed by the CPU 101, based on the electric power performance index value and the power consumption priority index value.

When one CPU 101 operates plural processes (threads), the process thread managing unit 125 of the OS 110 switches the thread to be executed every several milliseconds and thereby, causes the one CPU 101 to seem as if the one CPU 101 concurrently operates the plural threads. The amount of time to be allocated to each thread per unit time is determined for all threads by the process thread managing unit 125 based on priority information set in each thread. When the degrees of priority are equal, the time is evenly allocated to all the threads.

Figure 9:
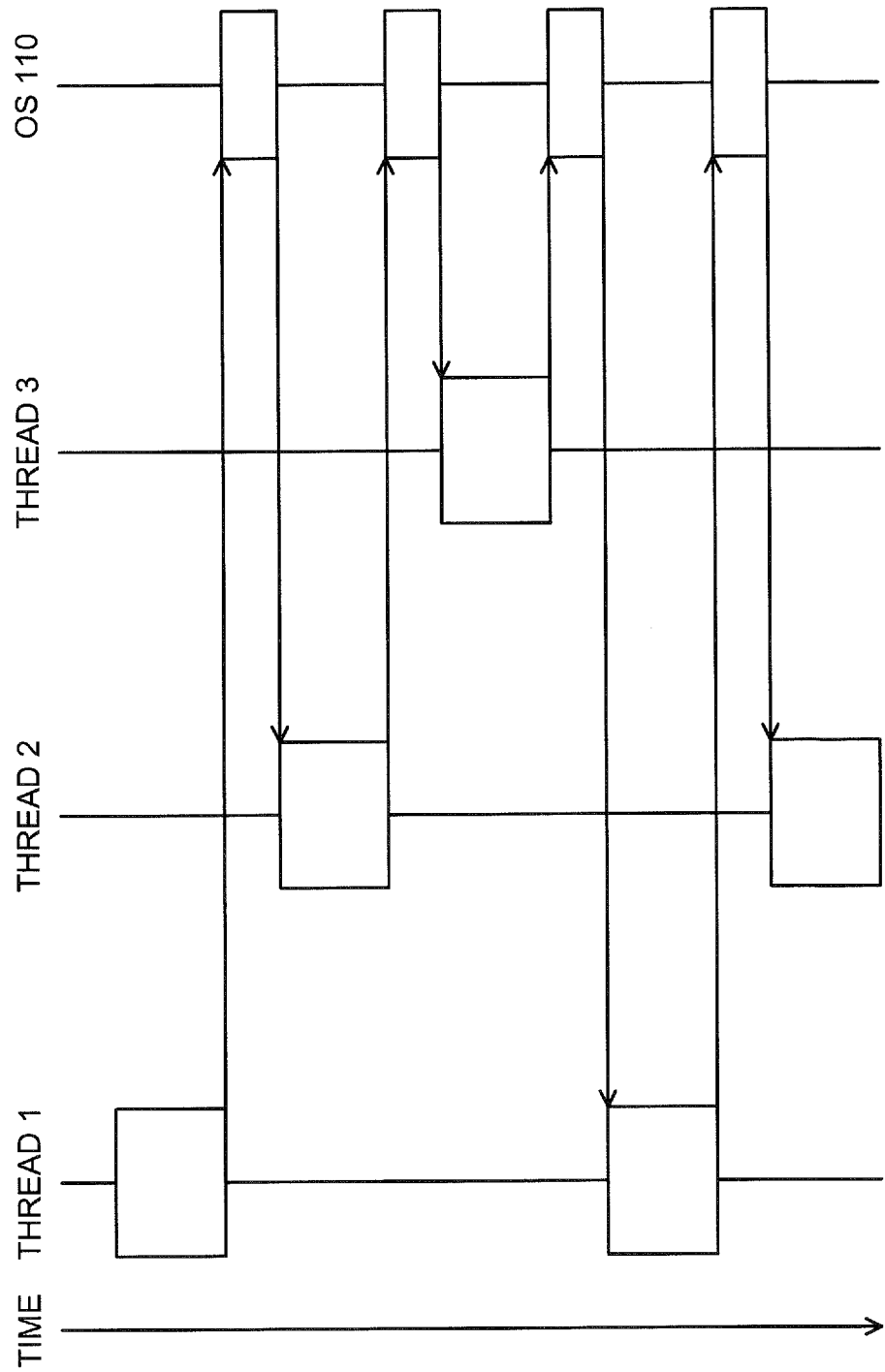
FIG. 9 is a timing chart depicting a state where a CPU executes plural processes.

FIG. 9 is a timing chart depicting a state where the CPU executes plural processes. As depicted, in the example, when three threads 1 to 3 are run concurrently, each of the threads 1 to 3 acquires one third of the unit time for the execution per unit time. The time period from the start of the execution of each of the threads 1 to 3 to the end thereof takes three times as long as that of one thread. The process thread managing unit 125 of the OS 110 entirely manages how many threads are currently processed and how much time is spent for the thread execution process.

Therefore, as depicted in FIG. 9, even when the CPU 101 runs the plural processes (threads), the index value processing unit 126 can calculate the ending time t1 of each thread based on the execution time period of each thread managed by the process thread managing unit 125 and the number of operating threads acquired by the operating thread number acquiring unit 122.

Figure 10:
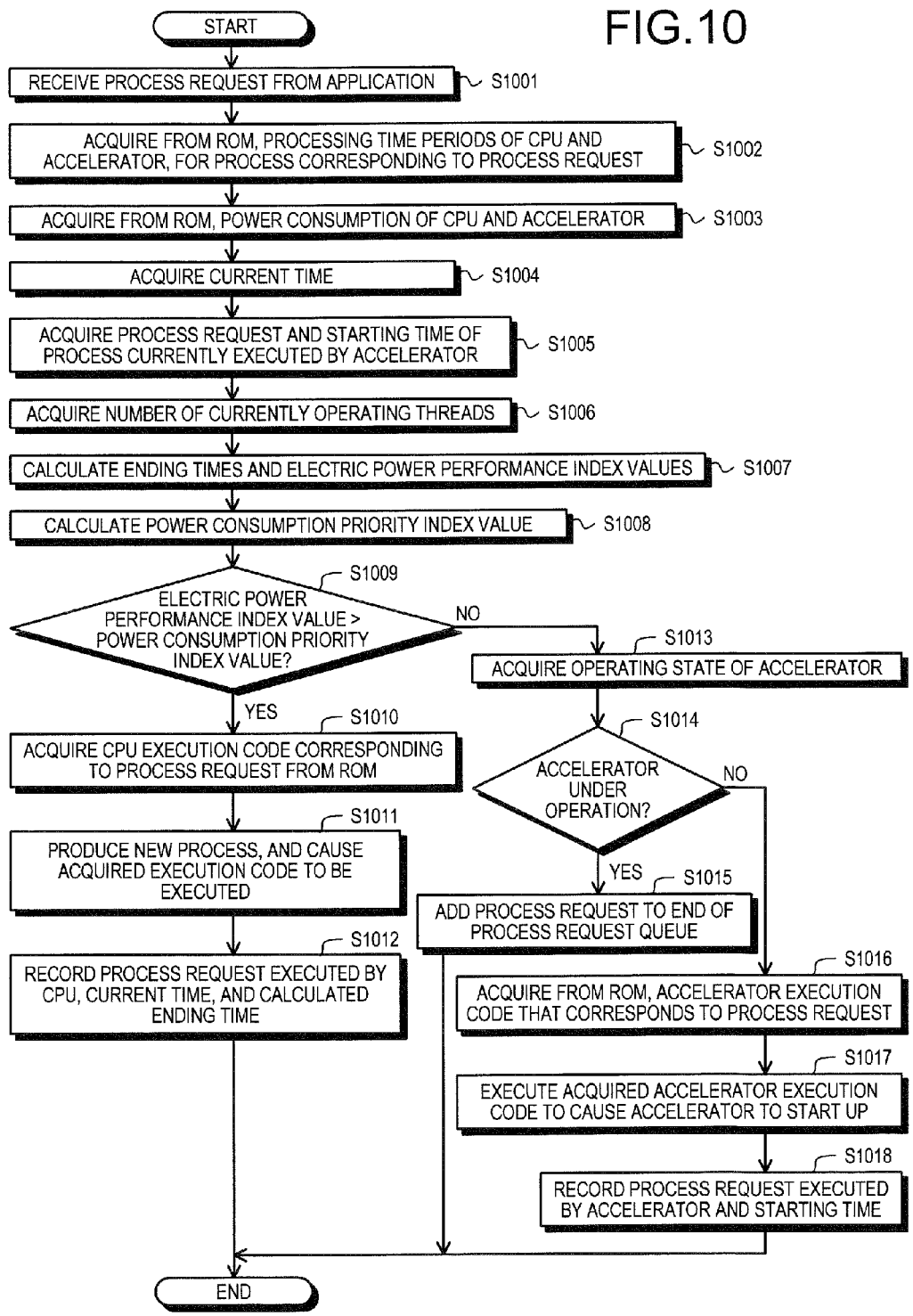
FIG. 10 is a flowchart of the content of a process of determining the execution assignment destination, executed by an execution assignment destination determining unit.

FIG. 10 is a flowchart of the content of the process of determining the execution assignment destination, executed by the execution assignment destination determining unit. The process executed by the execution assignment destination determining unit 111 of the OS 110 will be described with reference to FIG. 10.

Each time the process request receiving unit 121 of the execution assignment destination determining unit 111 receives a process request from the application (step S1001), the process request receiving unit 121 executes the process steps below to determine the execution assignment destination of the process for each request. The ROM information acquiring unit 124 acquires from the ROM 104 the processing time periods T1 and T2 for the CPU 101 and the accelerator 102, respectively, for the process corresponding to the process request (step S1002). The ROM information acquiring unit 124 acquires from the ROM 104, the power consumptions P1 and P2 of the CPU 101 and the accelerator 102 (step S1003). The execution assignment destination determining unit 111 acquires the current time (step S1004).

The accelerator managing unit 128 acquires the process request and the starting time of the process currently executed by the accelerator 102 (step S1005) and acquires the number of currently operating threads from the operating thread number acquiring unit 122 (step S1006). Thereby, the index value processing unit 126 of the execution assignment destination determining unit 111 calculates the ending time t1 for the CPU 101 for the process (thread) and the ending time t2 for the accelerator 102 therefor and also calculates the electric power performance index value (step S1007). As above, the electric power performance index value is calculated based on the ending time t1 for the CPU 101 to execute the requested process, the ending time t2 for the accelerator 102 to execute the requested process, and the estimated power consumptions PH1 and PH2 respectively for the CPU 101 and the accelerator 102 to execute the requested process.

In this case, the processing time period T1 for the CPU 101 to execute the process to be executed is measured at the design phase S600 and is recorded in the ROM 104 and therefore, the processing time period corresponding to the corresponding process is acquired from the ROM 104. On the other hand, as above, the ending time t2 for the execution by the accelerator 102 is the total of the remaining time period tn1 for the currently executed process that is currently executed by the accelerator 102, the total processing time period tn2 for unexecuted processes accumulated in the process request queue 801, the processing time period T2 for the execution of the corresponding process by the accelerator 102, and the starting time t0.

As above, the processing time periods T1 and T2 respectively for the CPU 101 and the accelerator 102 for the process are measured at the design phase and are recorded in the ROM 104 and therefore, the processing time periods T1 and T2 corresponding to the process requests are acquired from the ROM 104. The power consumptions PH1 and PH2 are also read from the ROM 104 and are used. The index value processing unit 126 calculates the power consumption priority index value from the condition of the mobile terminal (step S1008).

Acquisition of the unit-time priority index value is not limited to the calculation and a fixed value (for example, zero) can be used. If this value is zero, the execution assignment destination of the process is determined based only on the electric power performance index value. The power consumption priority index value is used as the threshold value to determine the value of the electric power performance index value and therefore, the execution assignment destination of the process can be determined only by simply executing a comparison between the power consumption priority index value and the electric power performance index value.

The assignment destination determining unit 129 of the execution assignment destination determining unit 111 compares the electric power performance index value and the power consumption priority index value (step S1009). If the electric power performance index value is greater than the power consumption priority index value (step S1009: YES), it is determined that the CPU 101 is to execute the process request from the application. If the electric power performance index value is smaller than the power consumption priority index value (step S1009: NO), it is determined that the accelerator 102 is to execute the process request from the application.

If it is determined that the CPU 101 is to execute the process (step S1009: YES), the process managing unit 113 of the OS 110 acquires the CPU execution code (the program code) 713 corresponding to the process request of the process to be executed recorded in the ROM 104 (step S1010), produces the new process, and causes the acquired execution code to be executed for the process (step S1011). The process managing unit 113 records into the process under CPU execution information 811 stored in the memory 103, the process request executed by the CPU 101, the current time, and the calculated ending time (step S1012) and causes this one process to come to an end.

On the other hand, if it is determined that the accelerator 102 is to execute the process (step S1009: NO), the process managing unit 113 acquires the operating state of the accelerator 102 from the accelerator managing unit 128 (step S1013) and determines whether the accelerator 102 is currently under operation (step S1014). If the process managing unit 113 determines that the accelerator 102 is currently under operation (step S1014: YES), the process managing unit 113 adds the process request to the process request queue 801n at the tail (step S1015), causes the accelerator 102 to execute the process, and causes this one process to come to an end.

If the process managing unit 113 determines at step S1014 that the accelerator 102 is not currently under operation (step S1014: NO), the process managing unit 113 acquires from the ROM 104, the accelerator execution code 714 that corresponds to the process request (step S1016), executes the acquired accelerator execution code 714 to cause the accelerator 102 to start up (step S1017), records the process request executed by the accelerator 102 and the starting time, into the process under accelerator execution information 812 stored in the memory 103 (step S1018), and causes this one process to come to an end.

FIG. 11 is a flowchart of a process executed by the execution assignment destination determining unit after the process executed by the accelerator comes to an end. When the accelerator managing unit 128 of the execution assignment destination determining unit 111 detects the end of the process executed by the accelerator 102 (step S1101), the process managing unit 113 acquires a process request from the process request queue 801a at the head (step S1102) and checks whether the acquisition is successfully executed (step S1103). If the process managing unit 113 determines that the acquisition is successfully executed (step S1103: YES), the process managing unit 113 causes the process to come to an end.

If the process managing unit 113 determines at step S1103 that the process request cannot successfully be acquired from the process request queue 801a at the head (step S1103: NO), the process managing unit 113 acquires from the ROM 104, the accelerator execution code 714 that corresponds to the process request (step S1104), executes the acquired accelerator execution code 714 to cause the accelerator 102 to start up (step S1105), records the process request executed by the accelerator 102 and the starting time into the process under accelerator execution information 812 stored in the memory 103 (step S1106), and causes this one process to come to an end.

The determination of the execution assignment destination of a process, when the load of the process varies will be described. An increase of the load is determined to occur when an application is started up that is different from the application already started up or when the number of threads (the load) is increased by a number exceeding a set number, during the monitoring of the load on the CPU 101. On the other hand, a decrease of the load is determined to occur when an application comes to an end that is different from the application already started up or when the number of threads (the load) is decreased by a number exceeding a set number, during the monitoring of the load on the CPU 101.

Figure 12A:
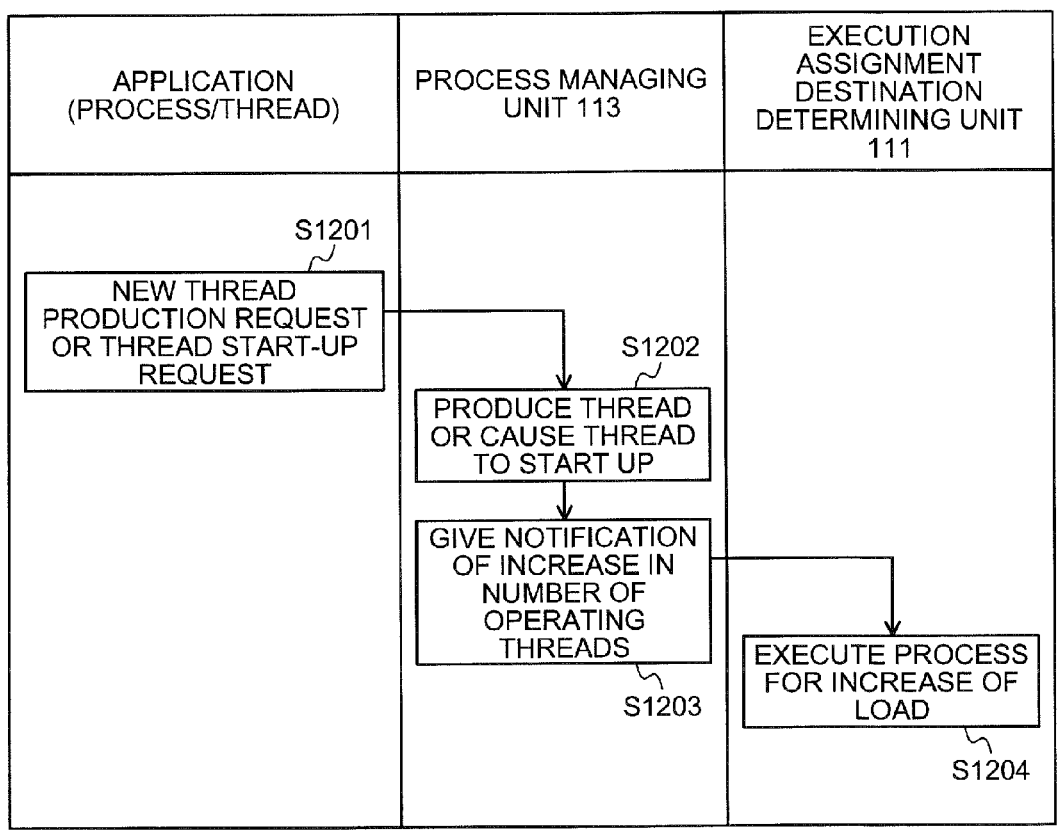
FIG. 12A is a flowchart of a process of detecting an increase of the load of a process.

FIG. 12A is a flowchart of the process of detecting an increase of the load of the process. When the load of the process increases, the application outputs a new thread production request or a thread start-up request (step S1201). Thereby, the process managing unit 113 produces a thread or causes the thread to start up (step S1202), and notifies the execution assignment destination determining unit 111 of the increase of the number of operating threads (step S1203). The execution assignment destination determining unit 111 executes the process of determining the execution assignment destination for the increase of the load, based on the increase of the number of operating threads notified of (step 1204).

Figure 12B:
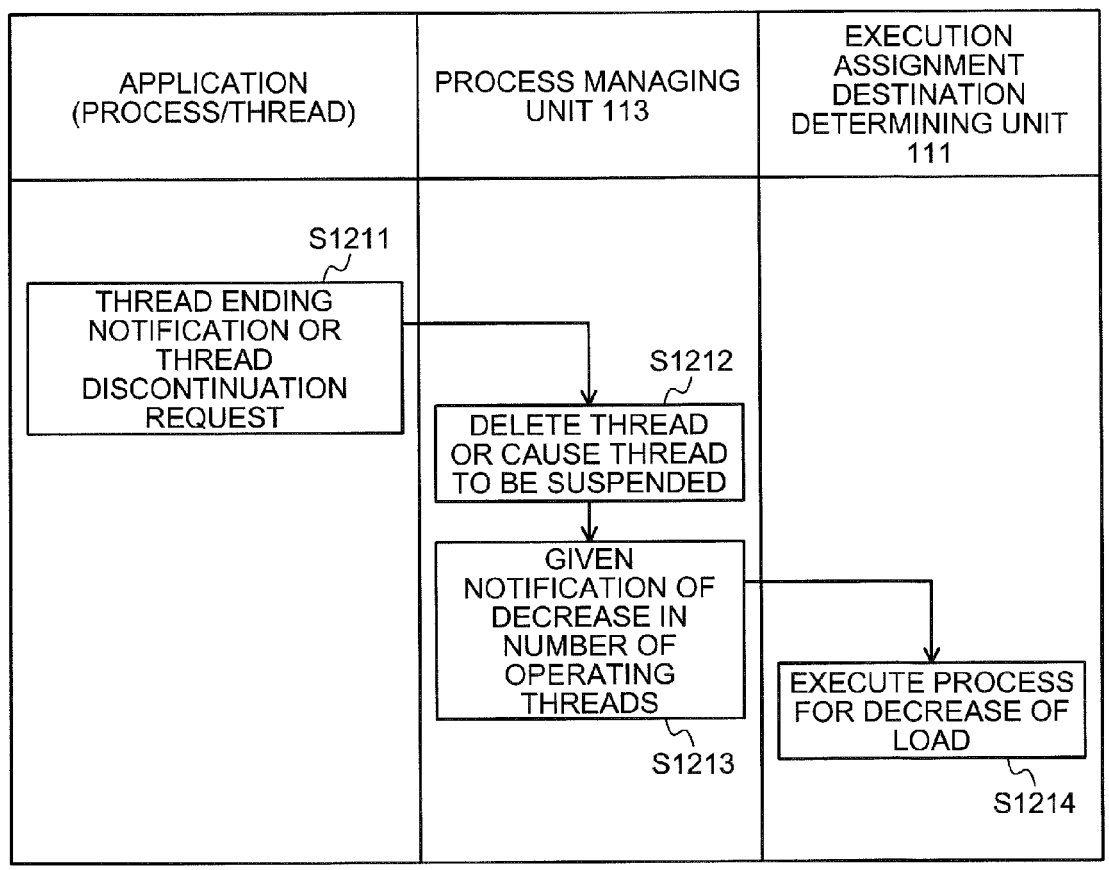
FIG. 12B is a flowchart of the process of detecting a decrease of the load of the process.

FIG. 12B is a flowchart of the process of detecting a decrease of the load of the process. When the load of the process decreases, the application outputs a thread ending notification or a thread discontinuation request (step S1211). Thereby, the process managing unit 113 deletes the thread or causes the thread to be suspended (step S1212), and notifies the execution assignment destination determining unit 111 of the decrease of the number of operating threads (step S1213). The execution assignment destination determining unit 111 executes the process of determining the execution assignment destination for the decrease of the load, based on the decrease of the number of operating threads notified of (step 1214).

As above, for the increase and the decrease of the load of the process, it is detected that the process managing unit 113 changes the number of operating threads according to the request from the application such as the addition, ending, discontinuation, or starting up of the thread.

When the execution of a new process by the accelerator 102 is more advantageous than the execution thereof by the CPU 101, the execution assignment destination determining unit 111 cancels the execution of the process by the CPU 101 and causes the accelerator 102 to execute the process. In contrast, when the CPU 101 does not need to execute the process for a time period and the execution of the new process by the CPU 101 is more advantageous than the execution thereof by the accelerator 102, the CPU 101 executes the process to be executed by the accelerator 102. For example, which one among the CPU 101 and the accelerator 102 is to execute the process is determined based on which one among the execution by the CPU 101 and the execution by the accelerator 102 expedites the ending time of the overall processing more.

Figure 13A:
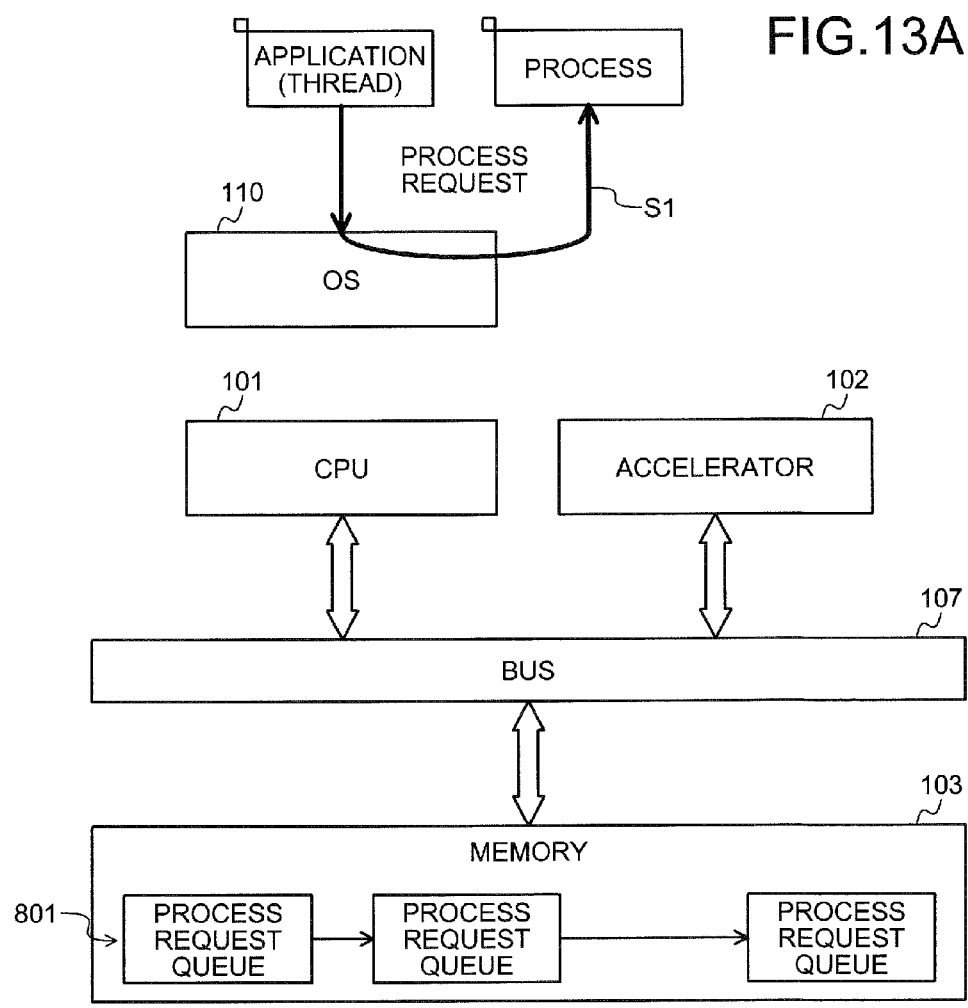
FIG. 13A is a diagram of a process request executed when the load increases.

A state will be described where the assignment of the process to be executed is changed when the load of the process increases. FIG. 13A is a diagram of a process request executed when the load increases. FIG. 13B is a diagram for explaining the ending time of the process executed when the load increases. When the thread executes the process request at the time t1, the execution assignment destination determining unit 111 estimates and calculates the ending time for the execution of the requested process by each of the CPU 101 and the accelerator 102.

It is assumed that the ending time is calculated to be the ending time t2 for the execution by the CPU 101. On the other hand, for the execution by the accelerator 102, many process requests 1301 are already queued and therefore, the time at which the execution can be started is a time t3 and the ending time is a time t4. The index value processing unit 126 calculates the electric power performance index value using the ending times t2 and t4. The assignment destination determining unit 129 determines that the execution by the CPU 101 provides higher efficiency, starts up a thread S1 for the process request of the CPU 101, and causes the CPU 101 to execute the process.

Figure 14A:
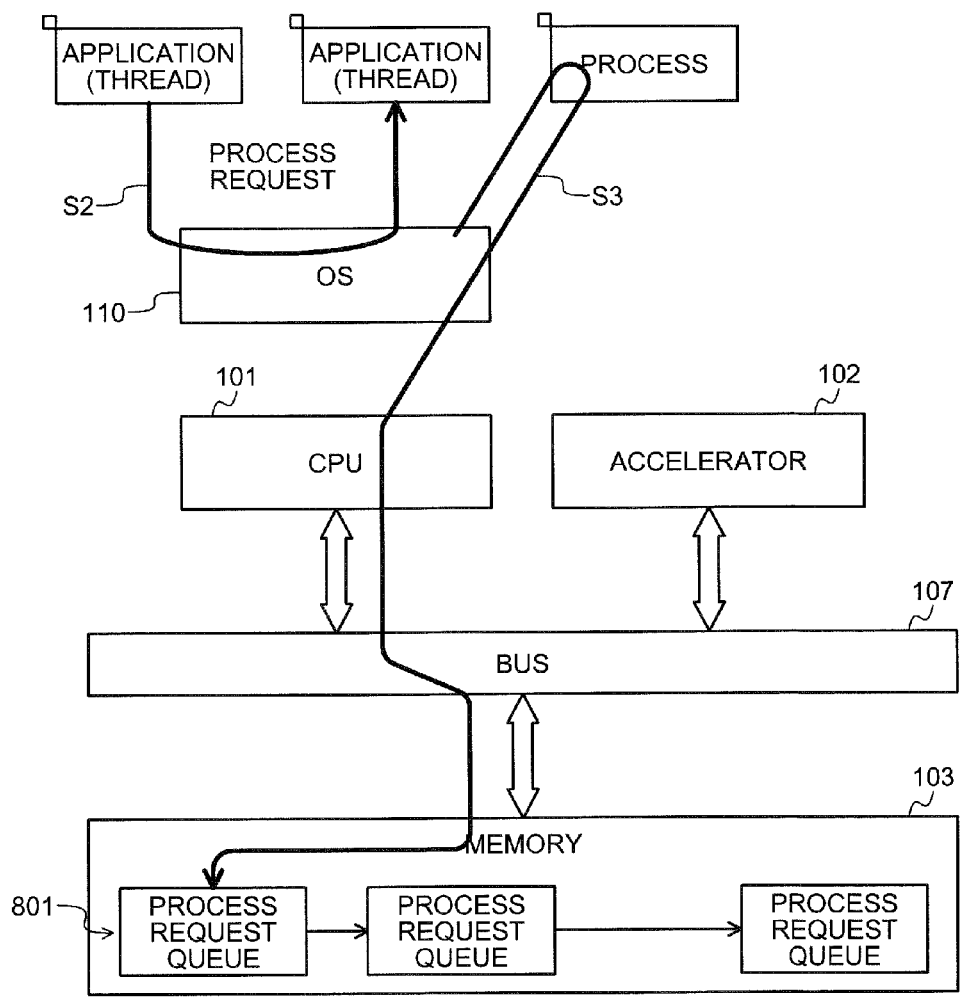
FIG. 14A is a diagram of a process request executed when the load increases due to the elapse of time.

A case will be described where the load varies consequent to an elapse of time after the execution of the process. FIG. 14A is a diagram of a process request executed when the load increases due to the elapse of time. FIG. 14B is a diagram for explaining the ending time of the process for the load increase consequent to the elapse of time.

It is assumed that a thread S2 is newly started up at a time t1' (t1<t1'<t2) in FIG. 14B after an elapse of a specific time period since the execution of the process described with reference to FIGS. 13A and 13B. Thereby, the load on the CPU 101 increases and therefore, the execution assignment destination determining unit 111 executes the process for the increased load. In the process for the increased load, ending times t2' and t4' respectively for the execution of the process by the CPU 101 and the execution thereof by the accelerator 102 are again calculated relative to the time t1' as the reference time.

For the accelerator 102, some process requests 1402 are added to the process request queue 801 between the times t3 and t3'. Thereby, it is assumed that, when a process is added to the accelerator 102 from the time t1', the time at which the execution by the accelerator 102 can be started is changed to the time t3' and the ending time thereof is changed to a time t4' as the result of the recalculation.

On the other hand, for the execution by the CPU 101, the execution progresses between t1 and t1'. However, it is assumed that the load on the CPU 101 increases because the thread S2 (1401) is newly added at the time t1' and consequently, the ending time is changed to the time t2' for the portion not yet executed at the time t1' as the result of the recalculation of the ending time based on the current load on the CPU 101. Thereby, the assignment destination determining unit 129 determines that execution of the process from now using the accelerator 102 provides higher efficiency, cancels the process of the thread S2 for the CPU 101, and adds a process request S3 to the process request queue 801.

FIG. 15 is a flowchart of an example of a process of determining the execution assignment destination when the load of the process increases. The process executed by the execution assignment destination determining unit 111 will be described. When the process managing unit 113 detects an increase of the load of the process (step S1501), the process request receiving unit 121 of the execution assignment destination determining unit 111 acquires the process request currently executed by the CPU 101, from the ROM 104 via the ROM information acquiring unit 124 (step S1502). The process request receiving unit 121 determines whether the process request can be acquired (step S1503). If the process request receiving unit 121 determines that the process request cannot be acquired (step S1503: NO), the process request receiving unit 121 causes the process to come to an end. If the process request receiving unit 121 determines that the process request can be acquired (step S1503: YES), the process request receiving unit 121 acquires the starting time and the ending time of the process currently executed by the CPU 101, from the memory 103 (step S1504).

The ROM information acquiring unit 124 acquires from the ROM 104, the processing time periods for the execution (by the CPU 101 and the accelerator 102) of the process corresponding to the process request (step S1505) and acquires the power consumptions of the CPU 101 and the accelerator 102 from the ROM 104 (step S1506). The execution assignment destination determining unit 111 acquires the current time (step S1507).

The accelerator managing unit 128 acquires the process request and the starting time of the process currently executed by the accelerator 102 (step S1508) and acquires the number of operating threads from the operating thread number acquiring unit 122 (step S1509). Thereby, the index value processing unit 126 of the execution assignment destination determining unit 111 calculates for the process (thread), a new ending time for the CPU 101 (in the example of FIG. 14B, the ending time t2') and a new ending time for the accelerator 102 (in the example of FIG. 14B, the ending time t4'), calculates the electric power performance index value (step S1510), and calculates the power consumption priority index value from the state of the mobile terminal (step S1511).

The assignment destination determining unit 129 of the execution assignment destination determining unit 111 compares the electric power performance index value and the power consumption priority index value (step S1512). If the assignment destination determining unit 129 determines that the electric power performance index value is greater than the power consumption priority index value (step S1512: YES), the assignment destination determining unit 129 determines that the CPU 101 is to execute the process request from the application, updates the ending time to the calculated new ending time, updates the process under CPU execution information 811 (step S1513), and causes the process to come to an end.

If the assignment destination determining unit 129 determines that the electric power performance index value is smaller than the power consumption priority index value (step S1512: NO), the assignment destination determining unit 129 determines that the accelerator 102 is to execute the process request from the application and the process managing unit 113 cancels the execution of the process currently executed by the CPU 101 (step S1514), acquires the operating state of the accelerator 102 from the accelerator managing unit 128 (step S1515), and determines whether the accelerator 102 is currently under operation (step S1516). If the process managing unit 113 determines that the accelerator 102 is currently under operation (step S1516: YES), the process managing unit 113 adds the process request to the process request queue 801n at the tail (step S1517), causes the accelerator 102 to execute the process, and causes this one process to come to an end.

If the process managing unit 113 determines that the accelerator 102 does not currently operate (step S1516: NO), the process managing unit 113 acquires the accelerator execution code 714 that corresponds to the process request from the ROM 104 (step S1518), executes the acquired accelerator execution code 714 to start up the accelerator 102 (step S1519), records the process request executed by the accelerator 102 and the starting time into the process under accelerator execution information 812 stored in the memory 103 (step S1520), and causes this one process to come to an end.

Figure 16A:
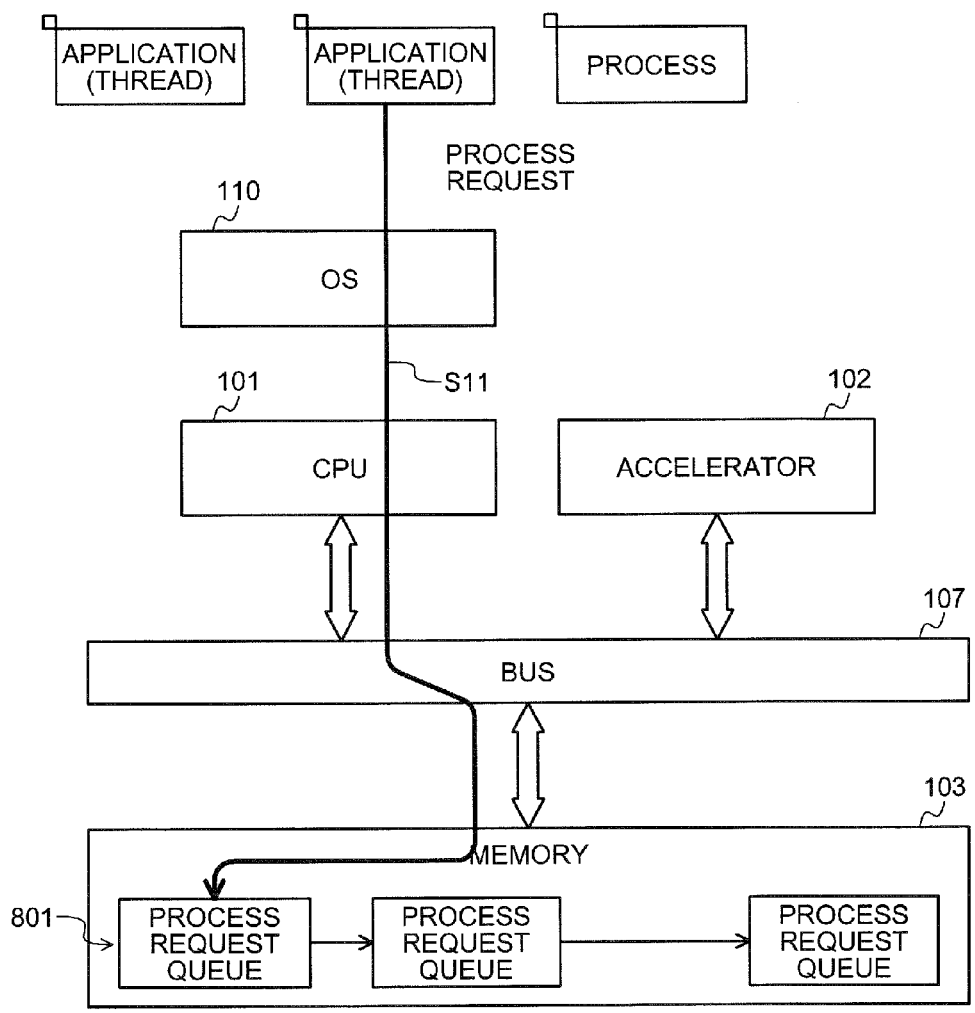
FIG. 16A is a diagram of a process request executed when the load decreases.
Figure 16B:
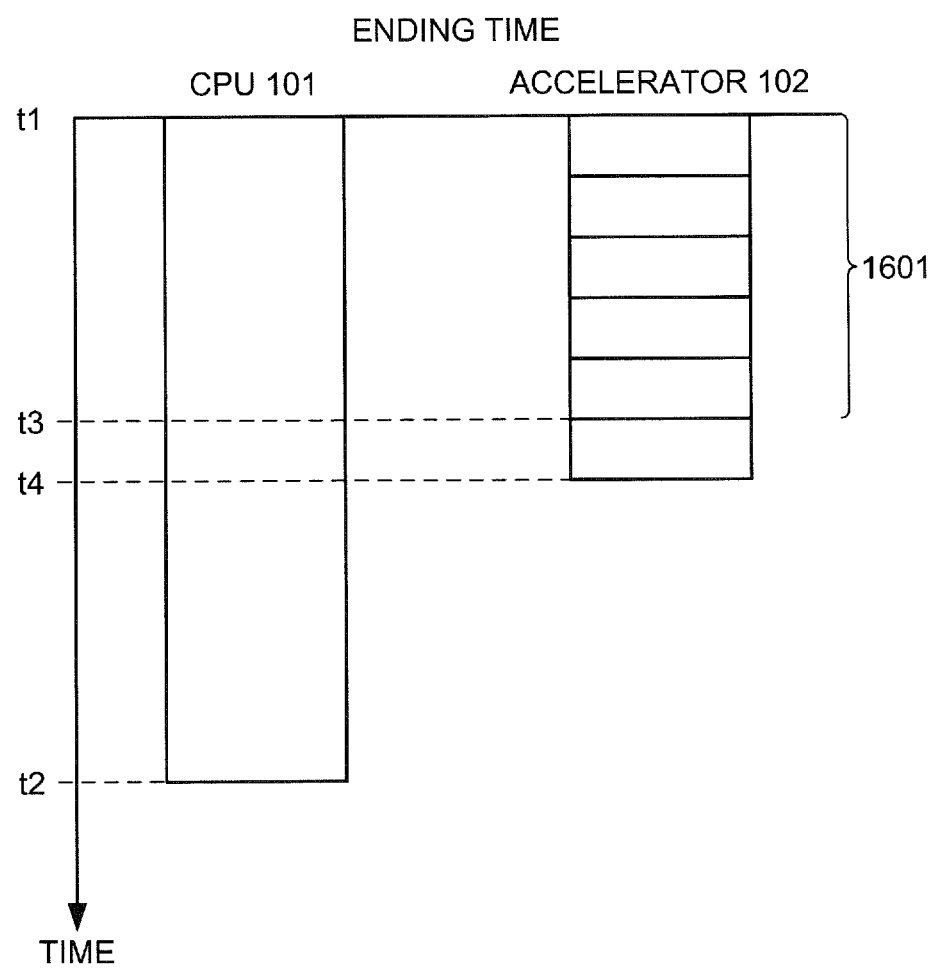
FIG. 16B is a diagram for explaining the ending time of the process executed when the load decreases.

A state will be described where the assignment of the process to be executed is changed when the load of the process decreases. FIG. 16A is a diagram of a process request executed when the load decreases. FIG. 16B is a diagram for explaining the ending time of the process executed when the load decreases. When the thread executes the process request at the time t1, the execution assignment destination determining unit 111 estimates and calculates the ending time for the execution of the requested process by each of the CPU 101 and the accelerator 102.

Processing of many threads is present for the execution by the CPU 101 and therefore, it is assumed that the ending time is calculated to be the ending time t2. On the other hand, the number of process requests 1601 is small that are queued in advance for the accelerator 102 and therefore, it is assumed that the ending time is calculated to be the ending time t4. The index value processing unit 126 calculates the electric power performance index value using the ending times t2 and t4. The assignment destination determining unit 129 determines that the execution by the accelerator 102 provides higher efficiency, and adds a process request S11 to the process request queue 801.

Figure 17A:
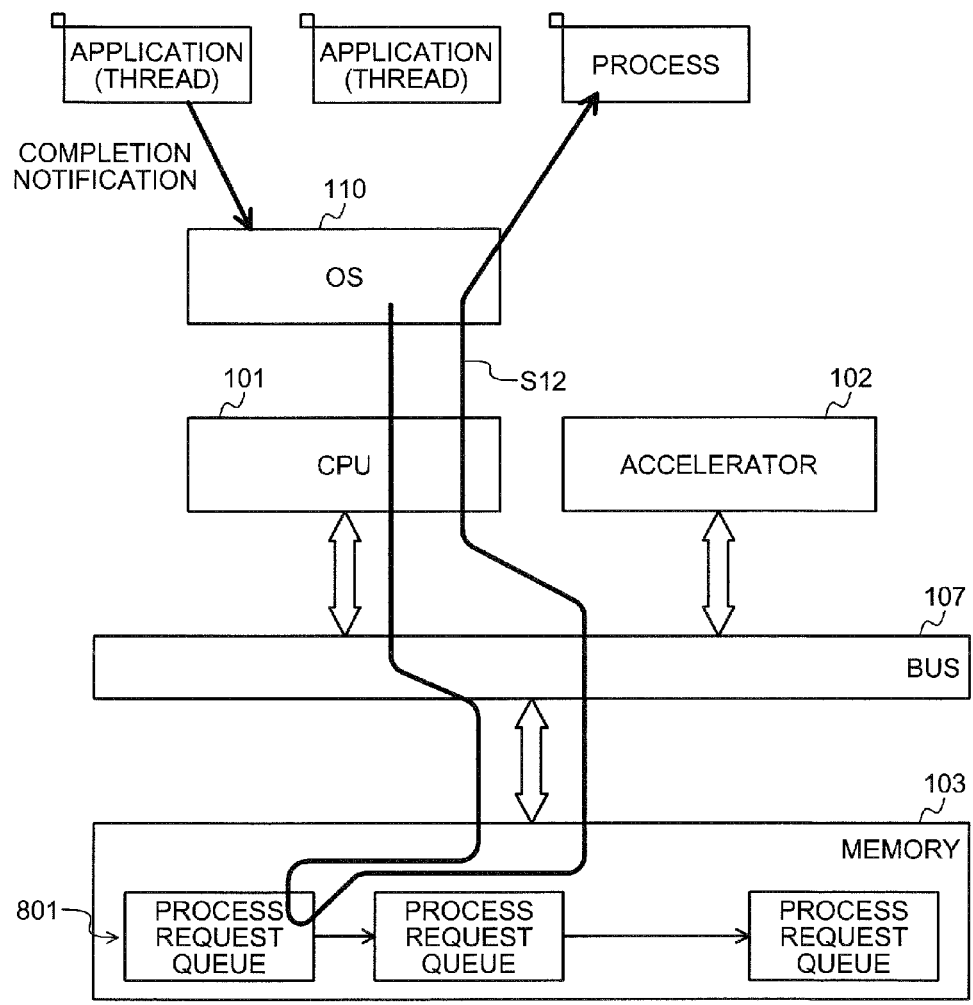
FIG. 17A is a diagram of a process request executed when the load decreases due to the elapse of time.

A case will be described where the load varies consequent to an elapse of time after the execution of the process. FIG. 17A is a diagram of a process request executed when the load decreases due to the elapse of time. FIG. 17B is a diagram for explaining the ending time of the process for the load decrease consequent to the elapse of time.

Assuming that the execution of the thread by the CPU 101 in turn comes to an end at the time t1' in FIG. 17B after an elapse of a specific time period since the time of the execution described with reference to FIGS. 16A and 16B, the load on the CPU 101 decreases and therefore, the execution assignment destination determining unit 111 again calculates the ending time similarly to the case of the increase of the load. In the example of FIGS. 16A and 16B, it is determined that the accelerator 102 executes the process at the time t1, and the process request is queued. Therefore, the starting time t3 and the ending time t4 for the accelerator 102 are not changed.

On the other hand, when the CPU 101 executes the process, the load of the process on the CPU 101 decreases and therefore, the ending time is changed to t2'. When the index value processing unit 126 calculates again the power consumption priority index value and, as a result, determines that the execution of the process by the CPU 101 provides higher efficiency, a process request S12 is removed (deleted) from the process request queue 801n at the tail and is executed for the thread.

FIG. 18 is a flowchart of an example of a process of determining the execution assignment destination, executed when the load of the process decreases. The process executed by the execution assignment destination determining unit 111 will be described. When the process managing unit 113 detects the decrease of the load of the process (step S1801), the queue managing unit 123 of the execution assignment destination determining unit 111 acquires the process request from a process request queue 801n at the tail in the memory 103 (step S1802), and determines whether the process request can be acquired (step S1803). When the process managing unit 113 determines that the process request cannot be acquired (step S1803: NO), the process managing unit 113 causes the process to come to an end. If the process managing unit 113 determines that the process request can be acquired (step S1803: YES), the process managing unit 113 acquires the processing time periods for the CPU 101 and the accelerator 102 for the process corresponding to the process request from the ROM 104 (step S1804), and acquires the power consumptions of the CPU 101 and the accelerator 102 from the ROM 104 (step S1805). The execution assignment destination determining unit 111 acquires the current time (step S1806).

The accelerator managing unit 128 acquires the process request and the starting time of the process currently executed by the accelerator 102 (step S1807) and acquires the number of operating threads from the operating thread number acquiring unit 122 (step S1808). Thereby, the index value processing unit 126 of the execution assignment destination determining unit 111 calculates for the process (thread), a new ending time for the CPU 101 (in the example of FIG. 17B, the ending time t2') and a new ending time for the accelerator 102 (in the example of FIG. 17B, the ending time t4), calculates the electric power performance index value (step S1809), and calculates the power consumption priority index value from the state of the mobile terminal (step S1810).

The assignment destination determining unit 129 of the execution assignment destination determining unit 111 compares the electric power performance index value and the power consumption priority index value (step S1811). If the assignment destination determining unit 129 determines that the electric power performance index value is greater than the power consumption priority index value (step S1811: YES), the assignment destination determining unit 129 determines that the CPU 101 is to execute the process request from the application. The assignment destination determining unit 129 deletes the process to be executed from the process request queue 801 (step S1812) and acquires the CPU execution code 713 from the ROM 104 (step S1813).

The process managing unit 113 produces a new process that corresponds to the process, sets the new process to execute the CPU execution code 713 (step S1814), records the process request executed by the CPU 101, the starting time, and the calculated ending time in the process under CPU execution information 811 (step S1815), and causes the process to come to an end.

If the assignment destination determining unit 129 determines that the electric power performance index value is smaller than the power consumption priority index value (step S1811: NO), the assignment destination determining unit 129 acquires the immediately previous process request of the process request queue 801 (step S1816), returns to the process at step S1803, and executes the process for the process request.

As above, when the CPU 101 can execute the process due to the variation of the load of the process, it is reconsidered whether the CPU 101 can execute the process accumulated in the process request queue 801 to be executed by the accelerator 102. In this case, the determination is repeated following the same process steps as those executed when a process is newly requested, based on the number of threads (the unused thread rate may be used) currently operated by the CPU 101 sequentially from the process of the process request queue 801n at the tail. If it is determined that the CPU 101 is to execute the process, the process request is removed from the process request queue 801 and the CPU 101 executes the process.

According to the technique disclosed above, the execution assignment destination is determined based on which of the execution of the process by the accelerator and that by the processor causes the process to come to an end earlier and therefore, the processing efficiency of each of the plural processes can be improved. The power consumption is acquired for each of the execution of the process by the accelerator and that by the processor and the electric performance index value including the power consumption is used. Thereby, the execution assignment destination of the process is determined. Therefore, an efficient execution assignment destination can be determined taking into consideration not only the processing efficiency but also the power consumption.

The execution assignment destination is determined using, together with the electric power performance index value, the power consumption priority index value determined from the current condition of the mobile terminal such as, for example, the remaining power amount of the battery. Thereby, the execution assignment destination of the process can be determined that corresponds to the remaining power amount of the battery of the mobile terminal varying over time and the current remaining power amount of the battery. Therefore, an optimal execution assignment destination not only having high processing efficiency but also having the power consumption for executing the process well balanced with the processing efficiency can be determined for each process and therefore, the high processing efficiency and the reduction of the power consumption of the entire system can concurrently be established.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system for execution assignment based on processing efficiency and power consumption, the system driven by a battery comprising:
a memory;
a CPU; and
an accelerator, wherein the CPU is configured to:
read from the memory, a first processing time period for the CPU to complete a given process and a second processing time period for the accelerator to complete the given process;
determine a first index value based on a difference between a first power consumption for the CPU to execute the given process during the first processing time period and a second power consumption for the accelerator to execute the given process during the second processing time period;
determine a second index value based on a remaining power amount of the battery, wherein the second index value is matched to be of a value comparable with the first index value by dividing a given coefficient, which is determined at a design phase of the system, by the remaining power amount of the battery, wherein the second index value is a threshold to be compared to the first index value;
select any one among the CPU and the accelerator to execute the given process based on a comparison between the first index value and the second index value, wherein the CPU is selected if the first index value is greater than the second index value; and
assign the given process to the selected one among the CPU and the accelerator.

2. The system according to claim 1, wherein the first index value is determined based on the first processing time period, a first ending time at which the CPU completes the given process, the first power consumption for the CPU to execute the given process, the second processing time period, a second ending time at which the accelerator completes the given process, and the second power consumption for the accelerator to execute the given process.

3. The system according to claim 1, wherein the CPU selects the accelerator when the first index value is smaller than the second index value.

4. The system according to claim 1, wherein the CPU is further configured to
monitor load of the CPU;
acquire when the load varies, a starting time of the given process and determine a new first ending time at which the CPU completes the given process and a new second ending time at which the accelerator completes the given process; and
determine the first index value based on the new first ending time and the new second ending time.

5. The system according to claim 4, wherein the CPU cancels the given process executed by the CPU when the first index value is smaller than the second index value when an increase of the load is detected.

6. The system according to claim 1, wherein the CPU is further configured to
acquire a state of use of the battery; and
acquire and output as information to determine the second index value, a remaining power amount of the battery and a state of use of a device concerning the remaining power amount of the battery.

7. A method for execution assignment based on processing efficiency and power consumption of a system driven by a battery and comprising a CPU and an accelerator, the method comprising:

reading from a memory, a first processing time period for the CPU to complete a given process and a second processing time period for the accelerator to complete the given process;

determining a first index value based on a difference between a first power consumption for the CPU to execute the given process during the first processing time period and a second power consumption for the accelerator to execute the given process during the second processing time period;

determining a second index value based on a remaining power amount of the battery, wherein the second index value is matched to be of a value comparable with the first index value by dividing a given coefficient, which is determined at a design phase of the system, by the remaining power amount of the battery, wherein the second index value is a threshold to be compared to the first index value;

selecting any one among the CPU and the accelerator to execute the given process based on a comparison between the first index value and the second index value, wherein the CPU is selected if the first index value is greater than the second index value; and assigning the given process to the any one among the CPU and the accelerator selected at the selecting.

8. The method according to claim 7, further comprising:

acquiring a starting time of the given process based on a process request for the given process;

determining a first ending time at which the CPU completes the given process and a second ending time at which the accelerator completes the given process, based on a starting time of the given process; and determining the first index value based on the first ending time and the second ending time.

9. The method according to claim 7, further comprising:

reading from the memory, the first power consumption for the CPU to execute the given process and the second power consumption for the accelerator to execute the given process; and determining the first index value based on the first power consumption and the second power consumption.

10. The method according to claim 7, wherein the selecting includes selecting the accelerator when the first index value is smaller than the second index value.

11. The method according to claim 7, further comprising:

monitoring load of the CPU;

acquiring when the load varies, a starting time of the given process and determining a new first ending time at which the CPU completes the given process and a new second ending time at which the accelerator completes the given process; and determining the first index value based on the new first ending time and the new second ending time.

* * * * *